United States Patent
Kumar et al.

(10) Patent No.: US 9,473,388 B2
(45) Date of Patent: Oct. 18, 2016

(54) SUPPORTING MULTICAST IN NOC INTERCONNECT

(71) Applicant: NetSpeed Systems, San Jose, CA (US)

(72) Inventors: Sailesh Kumar, San Jose, CA (US);
Eric Norige, East Lansing, MI (US);
Joe Rowlands, San Jose, CA (US); Joji Philip, San Jose, CA (US)

(73) Assignee: NETSPEED SYSTEMS, San Jose, CA (US)

( * ) Notice: Subject to any disclaimer, the term of this patent is extended or adjusted under 35 U.S.C. 154(b) by 253 days.

(21) Appl. No.: 13/961,705

(22) Filed: Aug. 7, 2013

(65) Prior Publication Data
US 2015/0043575 A1 Feb. 12, 2015

(51) Int. Cl.
H04L 12/761 (2013.01)
H04L 12/705 (2013.01)
H04L 12/753 (2013.01)
H04L 12/933 (2013.01)

(52) U.S. Cl.
CPC ............. *H04L 45/16* (2013.01); *H04L 49/109* (2013.01); *H04L 45/18* (2013.01); *H04L 45/48* (2013.01)

(58) Field of Classification Search
None
See application file for complete search history.

(56) References Cited

U.S. PATENT DOCUMENTS

| | | | |
|---|---|---|---|
| 5,432,785 A | 7/1995 | Ahmed et al. | |
| 5,764,740 A | 6/1998 | Holender | |
| 5,790,554 A * | 8/1998 | Pitcher et al. | 370/471 |
| 5,991,308 A | 11/1999 | Fuhrmann et al. | |
| 5,999,530 A * | 12/1999 | LeMaire et al. | 370/390 |
| 6,003,029 A | 12/1999 | Agrawal et al. | |
| 6,249,902 B1 | 6/2001 | Igusa et al. | |
| 6,415,282 B1 | 7/2002 | Mukherjea et al. | |
| 6,701,361 B1 * | 3/2004 | Meier | 709/224 |
| 6,778,531 B1 * | 8/2004 | Kodialam et al. | 370/390 |
| 6,925,627 B1 | 8/2005 | Longway et al. | |
| 7,065,730 B2 | 6/2006 | Alpert et al. | |
| 7,318,214 B1 | 1/2008 | Prasad et al. | |
| 7,590,959 B2 | 9/2009 | Tanaka | |

(Continued)

FOREIGN PATENT DOCUMENTS

| | | |
|---|---|---|
| CN | 103684961 A | 3/2014 |
| EP | 2597850 A1 * | 5/2013 |
| WO | 2014059024 A1 | 4/2014 |

OTHER PUBLICATIONS

Lu, Z., et al., Connection-Oriented Multicasting in Wormhole-Switched Networks on Chip, Emerging VLSI Technologies and Architectures, IEEE Computer Society Annual symposium, Mar. 2-3, 2006, 6 pages.

(Continued)

*Primary Examiner* — Hicham Foud
(74) *Attorney, Agent, or Firm* — Procopio, Cory, Hargreaves & Savitch LLP

(57) ABSTRACT

Example implementations are directed to more efficiently delivering a multicast message to multiple destination components from a source component. Multicast environment is achieved with transmission of a single message from a source component, which gets replicated in the NoC during routing towards the destination components indicated in the message. Example implementations further relate to an efficient way of implementing multicast in any given NoC topology, wherein one or more multicast trees in the given NoC topology are formed and one of these trees are used for routing a multicast message to its intended destination components mentioned therein.

13 Claims, 25 Drawing Sheets

(56) References Cited

U.S. PATENT DOCUMENTS

| | | | |
|---|---|---|---|
| 7,725,859 B1 | 5/2010 | Lenahan et al. | |
| 7,808,968 B1 | 10/2010 | Kalmanek, Jr. et al. | |
| 7,917,885 B2 | 3/2011 | Becker | |
| 8,050,256 B1 | 11/2011 | Bao et al. | |
| 8,059,551 B2 | 11/2011 | Milliken | |
| 8,098,677 B1* | 1/2012 | Pleshek et al. | 370/419 |
| 8,099,757 B2 | 1/2012 | Riedle et al. | |
| 8,136,071 B2 | 3/2012 | Solomon | |
| 8,281,297 B2 | 10/2012 | Dasu et al. | |
| 8,312,402 B1 | 11/2012 | Okhmatovski et al. | |
| 8,448,102 B2 | 5/2013 | Kornachuk et al. | |
| 8,492,886 B2 | 7/2013 | Or-Bach et al. | |
| 8,503,445 B2* | 8/2013 | Lo et al. | 370/389 |
| 8,541,819 B1 | 9/2013 | Or-Bach et al. | |
| 8,543,964 B2 | 9/2013 | Ge et al. | |
| 8,601,423 B1 | 12/2013 | Philip et al. | |
| 8,614,955 B2* | 12/2013 | Gintis et al. | 370/242 |
| 8,635,577 B2 | 1/2014 | Kazda et al. | |
| 8,667,439 B1 | 3/2014 | Kumar et al. | |
| 8,717,875 B2 | 5/2014 | Bejerano et al. | |
| 2002/0071392 A1 | 6/2002 | Grover et al. | |
| 2002/0073380 A1 | 6/2002 | Cooke et al. | |
| 2002/0095430 A1 | 7/2002 | Egilsson et al. | |
| 2002/0150094 A1* | 10/2002 | Cheng et al. | 370/389 |
| 2003/0005149 A1* | 1/2003 | Haas et al. | 709/238 |
| 2003/0200315 A1* | 10/2003 | Goldenberg et al. | 709/225 |
| 2004/0156376 A1* | 8/2004 | Nakagawa | H04L 12/5693 370/412 |
| 2004/0156383 A1* | 8/2004 | Nakagawa | H04L 49/103 370/432 |
| 2004/0216072 A1 | 10/2004 | Alpert et al. | |
| 2005/0147081 A1 | 7/2005 | Acharya et al. | |
| 2006/0104274 A1* | 5/2006 | Caviglia et al. | 370/390 |
| 2006/0161875 A1 | 7/2006 | Rhee | |
| 2007/0118320 A1 | 5/2007 | Luo et al. | |
| 2007/0244676 A1 | 10/2007 | Shang et al. | |
| 2007/0256044 A1 | 11/2007 | Coryer et al. | |
| 2007/0267680 A1 | 11/2007 | Uchino et al. | |
| 2008/0072182 A1 | 3/2008 | He et al. | |
| 2008/0120129 A1 | 5/2008 | Seubert et al. | |
| 2009/0067348 A1* | 3/2009 | Vasseur et al. | 370/256 |
| 2009/0070726 A1 | 3/2009 | Mehrotra et al. | |
| 2009/0268677 A1 | 10/2009 | Chou et al. | |
| 2009/0313592 A1 | 12/2009 | Murali et al. | |
| 2010/0040162 A1 | 2/2010 | Suehiro | |
| 2010/0284309 A1* | 11/2010 | Allan et al. | 370/256 |
| 2011/0035523 A1 | 2/2011 | Feero et al. | |
| 2011/0044336 A1* | 2/2011 | Umeshima | 370/390 |
| 2011/0060831 A1 | 3/2011 | Ishii et al. | |
| 2011/0064077 A1* | 3/2011 | Wen | 370/390 |
| 2011/0072407 A1 | 3/2011 | Keinert et al. | |
| 2011/0154282 A1 | 6/2011 | Chang et al. | |
| 2011/0276937 A1 | 11/2011 | Waller | |
| 2012/0022841 A1 | 1/2012 | Appleyard | |
| 2012/0023473 A1 | 1/2012 | Brown et al. | |
| 2012/0026917 A1 | 2/2012 | Guo et al. | |
| 2012/0110541 A1 | 5/2012 | Ge et al. | |
| 2012/0155250 A1 | 6/2012 | Carney et al. | |
| 2012/0218998 A1* | 8/2012 | Sarikaya | 370/390 |
| 2013/0021896 A1* | 1/2013 | Pu et al. | 370/216 |
| 2013/0051397 A1 | 2/2013 | Guo et al. | |
| 2013/0080073 A1 | 3/2013 | de Corral | |
| 2013/0103369 A1 | 4/2013 | Huynh et al. | |
| 2013/0151215 A1 | 6/2013 | Mustapha | |
| 2013/0159944 A1 | 6/2013 | Uno et al. | |
| 2013/0174113 A1 | 7/2013 | Lecler et al. | |
| 2013/0207801 A1 | 8/2013 | Barnes | |
| 2013/0219148 A1 | 8/2013 | Chen et al. | |
| 2013/0263068 A1 | 10/2013 | Cho et al. | |
| 2013/0326458 A1 | 12/2013 | Kazda et al. | |
| 2014/0068132 A1 | 3/2014 | Philip et al. | |
| 2014/0092740 A1 | 4/2014 | Wang et al. | |
| 2014/0098683 A1 | 4/2014 | Kumar et al. | |
| 2014/0115218 A1 | 4/2014 | Philip et al. | |
| 2014/0115298 A1 | 4/2014 | Philip et al. | |
| 2014/0307590 A1* | 10/2014 | Dobbelaere | 370/260 |

OTHER PUBLICATIONS

Yan, S. et al., Design of Application-Specific 3D Networks-on-Chip Architectures, Computer Design, IEEE International Conference, Oct. 12-15, 2008, 8 pages.

Abts, D., et al., Age-Based Packet Arbitration in Large-Radix k-ary n-cubes, Supercomputing 2007 (SC07), Nov. 10-16, 2007, 11 pgs.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E. et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71 (5), May 2011, 14 pgs.

International Search Report and Written Opinion for PCT/US2013/064140, Jan. 22, 2014, 9 pgs.

International Search Report and Written Opinion for PCT/US2014/012003, Mar. 26, 2014, 9 pgs.

International Search Report and Written Opinion for PCT/US2014/012012, May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

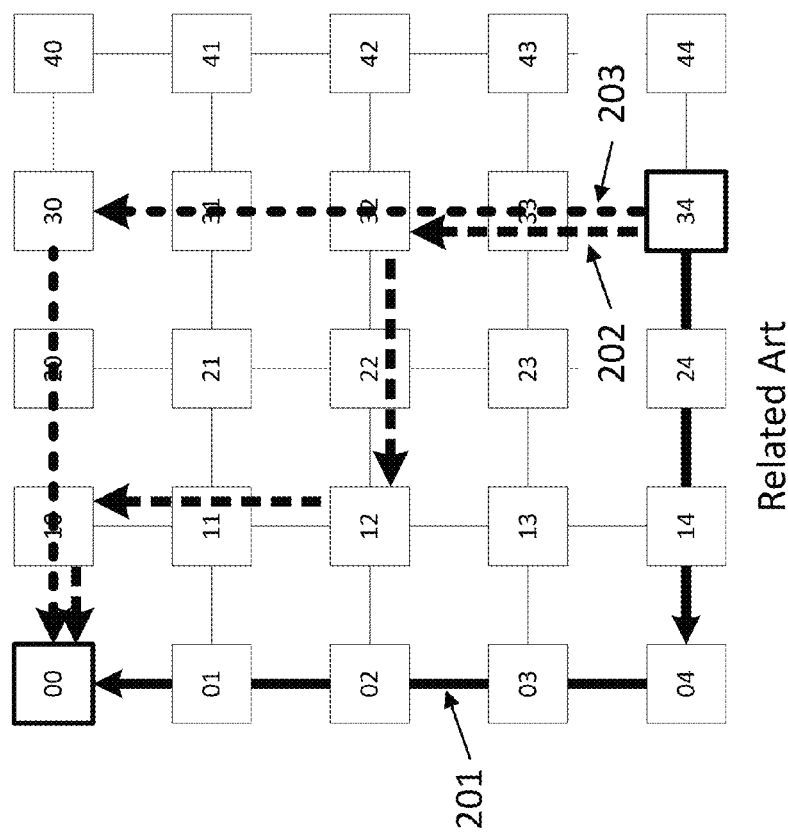

SUPPORTING MULTICAST IN NOC INTERCONNECT

BACKGROUND

1. Technical Field

Methods and example implementations described herein are generally directed to interconnect architecture, and more specifically, to support multicast messages in NoC interconnect.

2. Related Art

The number of components on a chip is rapidly growing due to increasing levels of integration, system complexity, and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both SoC and CMP systems, the on-chip interconnect plays a role in providing high-performance communication between the various components. Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links.

Messages are injected by the source and are routed from the source node to the destination over multiple intermediate nodes and physical links. The destination node then ejects the message and provides the message to the destination. For the remainder of this application, the terms 'components', 'blocks', 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as a 'multi-core system'.

There are several topologies in which the routers can connect to one another to create the system network. Bi-directional rings (as shown in FIG. 1(a)), 2-D (two dimensional) mesh (as shown in FIG. 1(b)) and 2-D Torus (as shown in FIG. 1(c)) are examples of topologies in the related art. Mesh and Torus can also be extended to 2.5-D (two and half dimensional) or 3-D (three dimensional) organizations. FIG. 1(d) shows a 3D mesh NoC, where there are three layers of 3×3 2D mesh NoC shown over each other. The NoC routers have up to two additional ports, one connecting to a router in the higher layer, and another connecting to a router in the lower layer. Router 111 in the middle layer of the example has both ports used, one connecting to the router at the top layer and another connecting to the router at the bottom layer. Routers 110 and 112 are at the bottom and top mesh layers respectively, therefore they have only the upper facing port 113 and the lower facing port 114 respectively connected.

Packets are message transport units for intercommunication between various components. Routing involves identifying a path composed of a set of routers and physical links of the network over which packets are sent from a source to a destination. Components are connected to one or multiple ports of one or multiple routers; with each such port having a unique ID. Packets carry the destination's router and port ID for use by the intermediate routers to route the packet to the destination component.

Examples of routing techniques include deterministic routing, which involves choosing the same path from A to B for every packet. This form of routing is independent from the state of the network and does not load balance across path diversities, which might exist in the underlying network. However, such deterministic routing may implemented in hardware, maintains packet ordering and may be rendered free of network level deadlocks. Shortest path routing may minimize the latency as such routing reduces the number of hops from the source to the destination. For this reason, the shortest path may also be the lowest power path for communication between the two components. Dimension-order routing is a form of deterministic shortest path routing in 2-D, 2.5-D, and 3-D mesh networks. In this routing scheme, messages are routed along each coordinates in a particular sequence until the message reaches the final destination. For example in a 3-D mesh network, one may first route along the X dimension until it reaches a router whose X-coordinate is equal to the X-coordinate of the destination router. Next, the message takes a turn and is routed in along Y dimension and finally takes another turn and moves along the Z dimension until the message reaches the final destination router. Dimension ordered routing may be minimal turn and shortest path routing.

FIG. 2(a) pictorially illustrates an example of XY routing in a two dimensional mesh. More specifically, FIG. 2(a) illustrates XY routing from node '34' to node '00'. In the example of FIG. 2(a), each component is connected to only one port of one router. A packet is first routed over the x-axis till the packet reaches node '04' where the x-coordinate of the node is the same as the x-coordinate of the destination node. The packet is next routed over the y-axis until the packet reaches the destination node.

In heterogeneous mesh topology in which one or more routers or one or more links are absent, dimension order routing may not be feasible between certain source and destination nodes, and alternative paths may have to be taken. The alternative paths may not be shortest or minimum turn.

Source routing and routing using tables are other routing options used in NoC. Adaptive routing can dynamically change the path taken between two points on the network based on the state of the network. This form of routing may be complex to analyze and implement.

A NoC interconnect may contain multiple physical networks. Over each physical network, there may exist multiple virtual networks, wherein different message types are transmitted over different virtual networks. In this case, at each physical link or channel, there are multiple virtual channels; each virtual channel may have dedicated buffers at both end points. In any given clock cycle, only one virtual channel can transmit data on the physical channel.

NoC interconnects may employ wormhole routing, wherein, a large message or packet is broken into small pieces known as flits (also referred to as flow control digits). The first flit is the header flit, which holds information about this packet's route and key message level info along with payload data and sets up the routing behavior for all subsequent flits associated with the message. Optionally, one or more body flits follows the head flit, containing the remaining payload of data. The final flit is the tail flit, which in addition to containing the last payload also performs some bookkeeping to close the connection for the message. In wormhole flow control, virtual channels are often implemented.

The physical channels are time sliced into a number of independent logical channels called virtual channels (VCs). VCs provide multiple independent paths to route packets, however they are time-multiplexed on the physical channels.

A virtual channel holds the state needed to coordinate the handling of the flits of a packet over a channel. At a minimum, this state identifies the output channel of the current node for the next hop of the route and the state of the virtual channel (idle, waiting for resources, or active). The virtual channel may also include pointers to the flits of the packet that are buffered on the current node and the number of flit buffers available on the next node.

The term "wormhole" plays on the way messages are transmitted over the channels: the output port at the next router can be so short that received data can be translated in the head flit before the full message arrives. This allows the router to quickly set up the route upon arrival of the head flit and then opt out from the rest of the conversation. Since a message is transmitted flit by flit, the message may occupy several flit buffers along its path at different routers, creating a worm-like image.

Based upon the traffic between various end points, and the routes and physical networks that are used for various messages, different physical channels of the NoC interconnect may experience different levels of load and congestion. The capacity of various physical channels of a NoC interconnect is determined by the width of the channel (number of physical wires) and the clock frequency at which it is operating. Various channels of the NoC may operate at different clock frequencies, and various channels may have different widths based on the bandwidth requirement at the channel. The bandwidth requirement at a channel is determined by the flows that traverse over the channel and their bandwidth values. Flows traversing over various NoC channels are affected by the routes taken by various flows. In a mesh or Torus NoC, there may exist multiple route paths of equal length or number of hops between any pair of source and destination nodes. For example, in FIG. 2(b), in addition to the standard XY route between nodes 34 and 00, there are additional routes available, such as YX route 203 or a multi-turn route 202 that makes more than one turn from source to destination.

In a NoC with statically allocated routes for various traffic flows, the load at various channels may be controlled by intelligently selecting the routes for various flows. When a large number of traffic flows and substantial path diversity is present, routes can be chosen such that the load on all NoC channels is balanced nearly uniformly, thus avoiding a single point of bottleneck. Once routed, the NoC channel widths can be determined based on the bandwidth demands of flows on the channels. Unfortunately, channel widths cannot be arbitrarily large due to physical hardware design restrictions, such as timing or wiring congestion. There may be a limit on the maximum channel width, thereby putting a limit on the maximum bandwidth of any single NoC channel.

Additionally, wider physical channels may not help in achieving higher bandwidth if messages are short. For example, if a packet is a single flit packet with a 64-bit width, no matter how wide a channel is, the channel will only be able to carry 64 bits per cycle of data if all packets over the channel are similar. Thus, a channel width is also limited by the message size in the NoC. Due to these limitations on the maximum NoC channel width, a channel may not have enough bandwidth in spite of balancing the routes.

To address the above bandwidth concern, multiple parallel physical NoCs may be used. Each NoC may be called a layer, thus creating a multi-layer NoC architecture. Hosts inject a message on a NoC layer; the message is then routed to the destination on the NoC layer, where it is delivered from the NoC layer to the host. Thus, each layer operates more or less independently from each other, and interactions between layers may only occur during the injection and ejection times. FIG. 3(a) illustrates a two layer NoC. Here the two NoC layers are shown adjacent to each other on the left and right, with the hosts connected to the NoC replicated in both left and right diagrams. A host is connected to two routers in this example—a router in the first layer shown as R1, and a router is the second layer shown as R2. In this example, the multi-layer NoC is different from the 3D NoC, i.e. multiple layers are on a single silicon die and are used to meet the high bandwidth demands of the communication between hosts on the same silicon die. Messages do not go from one layer to another. For purposes of clarity, the present application will utilize such a horizontal left and right illustration for multi-layer NoC to differentiate from the 3D NoCs, which are illustrated by drawing the NoCs vertically over each other.

In FIG. 3(b), a host connected to a router from each layer, R1 and R2 respectively, is illustrated. Each router is connected to other routers in its layer using directional ports 301, and is connected to the host using injection and ejection ports 302. A bridge-logic 303 may sit between the host and the two NoC layers to determine the NoC layer for an outgoing message and sends the message from host to the NoC layer, and also perform the arbitration and multiplexing between incoming messages from the two NoC layers and delivers them to the host.

In a multi-layer NoC, the number of layers needed may depend upon a number of factors such as the aggregate bandwidth requirement of all traffic flows in the system, the routes that are used by various flows, message size distribution, maximum channel width, etc. Once the number of NoC layers in NoC interconnect is determined in a design, different messages and traffic flows may be routed over different NoC layers. Additionally, one may design NoC interconnects such that different layers have different topologies in number of routers, channels and connectivity. The channels in different layers may have different widths based on the flows that traverse over the channel and their bandwidth requirements. With such a large variety of design choices, determining the right combination of routers, channels, and interconnections for a given system remains a challenge and time consuming manual process, often resulting in sub-optimal and inefficient designs.

Placing hosts in a SoC floorplan to optimize the interconnect performance is also important. For example, if two hosts communicate with each other frequently and require higher bandwidth than other interconnects, it may be better to place them closer to each other so that the transactions between these hosts can go over fewer router hops and links and the overall latency and the NoC cost can be reduced.

Assuming that two hosts with certain shapes and sizes cannot spatially overlap with each other on a 2D SoC plane, tradeoffs may need to be made. Moving certain hosts closer to improve inter-communication between them, may force certain other hosts to be further apart, thereby penalizing inter-communication between those other hosts. To make tradeoffs that improve system performance, certain system performance metrics, such as the average global communication latency, may be used as an objective function to optimize as hosts are placed in a NoC topology. Determining substantially optimal host positions that maximizes the system performance metric may involve analyzing the connectivity and inter-communication properties between all hosts and judiciously placing them onto the 2D NoC topology.

Consider an example wherein there are 16 CPUs and 2 memories that need to be placed in a 3×6 mesh organization. Let the first set of 8 CPUs communicate with the first memory MEM1 and the second set of 8 CPUs communicate with the second memory MEM2 as illustrated in FIG. 4(a). The CPUs and memories may be placed in a 3×6 mesh in sequential order as shown in FIG. 4(b), wherein each host occupies a cell in the mesh and is directly connected to the router of the cell, without consideration of the traffic between various hosts. As can be seen, the inter-communicating hosts are placed far from each other, which lead to high average and peak structural latencies in number of hops. For instance, messages between hosts CPU1 and MEM1 need to go over 7 router nodes, and messages between hosts CPU13 and MEM2 needs to travel 6 hops as illustrated in the figure. Such long paths not only increase latency but also adversely affect the interconnect bandwidth, as messages stay in the NoC for longer periods and consume bandwidth of a large number of links.

One may place the above set of hosts in an organization as shown in FIG. 4(c), which will significantly reduce the average and peak structural latency values. As shown, the maximum structural latency in this organization between inter-communicating hosts is 3 router hops, and a large fraction of inter-communicating hosts are only 2 router hops apart. The host positions in FIG. 4(c) can be achieved from FIG. 4(b) by repeatedly relocating certain hosts from their previous positions to new positions and in process swapping them with the hosts already present at the new positions. While it is relatively intuitive in this example to come up with optimal host positions, if the traffic profile consists of complex connectivity and highly asymmetric bandwidth and latency specifications between various hosts, determining optimal positions for the hosts in a NoC topology may be much more difficult. In fact, it may be reduced to a known NP-hard problem. Thus, heuristic approaches must be used to determine optimal host positions in such settings.

Supporting multicast in NoCs is another challenging function. Multicasting may be used in applications where a source agent needs to transmit the same message to multiple destination agents simultaneously. If these messages are unicasted once for each destination, the bandwidth consumption of channels near the source agent will be excessive as these channels will have to carry the same message multiple times. Additionally, there will be a substantial increase in latency as messages will be transmitted sequentially over these channels. Multicast support in a NoC allows source components to send messages to a group of destination components with a single message transmitted by the source component. Once transmitted by the source component/agent, the message is replicated within the NoC at various nodes in multiple messages, and message copies continue to be routed along different routes leading towards the destinations components/agents.

Multicast in NoCs may be based on a connection-oriented design in the related art, wherein a multicast group can request to reserve virtual channels during establishment and has priority on arbitration of link bandwidth. Multicasting starts after a multicast group is established, wherein once the multicast data packet transmission is complete, the group can be released by its master by sending a release packet to its members. When the release packet reaches a node, the multicast record in the switch and the reserved lane will be freed after all on-going group transactions are completed. Upon reaching the last member, a release acknowledgment is sent back to the master.

The related art also includes a Ripup-Reroute-and-Router-Merging (RRRM) algorithm that synthesizes custom 3D-NoC architectures, wherein the algorithm is based on a ripup-reroute formulation for routing flows to find network topology followed by a router merging procedure to optimize network topology. For the network topology derived, routes for the corresponding flows and the bandwidth requirements for the corresponding network links are determined and the implementation cost is evaluated based on design objective and constraints.

Supporting multicast in NoC is challenging due to a number of reasons. Multicast creates additional channel dependencies in the NoC, which requires more complex deadlock avoidance schemes. Furthermore, determining all routes for multicasting is non-trivial and storing information of these routes in a transaction message requires a large overhead. Quality of service is also challenging with multicast support, and message replication hardware at routers is non-trivial to implement. Multicast support in NoC therefore remains very limited.

SUMMARY

The present application is directed to more efficiently delivering a multicast message to multiple destination components from a source component. Multicast environment is achieved with transmission of a single message from a source component, which gets replicated in the NoC during routing towards the destination components indicated in the message. Aspects of the present application further relate to an efficient way of implementing multicast in any given NoC topology, wherein one or more multicast trees in the given NoC topology are formed and one of these trees are used for routing a multicast message to its intended destination components mentioned therein.

Aspects of the present application may include a method, which involves creation of one or more multicast trees using nodes of NoC interconnect and configure a source node to receive a message from a source component that initiates a multicast message, and transmit the message by selecting an appropriate message tree. Nodes of a multicast tree may incorporate filters at each of their ports, which can be configured to assess each multicast message as it arrives in order to decide whether the message should be passed on down the tree based on the intended destination nodes mentioned in the message and nodes that can be accessed through the evaluating current node.

Aspects of the present application may include a method, which involves, identification of an appropriate multicast tree for each node for a given message, wherein multiple parameters such as distance of all destination nodes, latency, bandwidth, and pre-defined preferences among other attributes can be factored for deciding the tree for the current transaction/message flow. Another aspect of the present application may involve techniques for handling inverted multicast messages using a distribution and aggregation node that aggregates messages from multiple destination nodes (which in the inverted multicast messages become source nodes) to form a single message, which is then sent to the source node (which in the inverted multicast messages becomes destination node).

Aspect of present application may include a computer readable storage medium storing instructions for executing a process. The instructions may involve, creation of one or more multicast trees using nodes of NoC interconnect and configure a source node to receive a message from a source component that initiates a multicast message, and transmit the message by selecting an appropriate message tree. Nodes of a multicast tree may include filters at each of their ports, which can be configured to assess each multicast message as and when the message arrives in order to decide whether the message should be passed on down the tree based on the intended destination nodes in the message and nodes that can be accessed through the current node.

Aspects of present application may include a method, which involves, for a network on chip (NoC) configuration, including a plurality of cores interconnected by a plurality of routers in a heterogeneous or heterogeneous mesh, ring, or Torus arrangement, creating of one or more multicast trees using nodes of NoC interconnect and configuring a source node to receive a message from a source component that initiates a multicast message, and transmitting the message by selecting an appropriate message tree. Nodes of a multicast tree may include filters at each of their ports, which can be configured to assess each multicast message as and when it arrives in order to decide whether the message should be passed on down the tree based on the intended destination nodes in the message and nodes that can be accessed through the current node.

Aspects of the present application may include a system, which involves, a multicast tree formation module, a multicast message transmission module, and a multicast message response module, wherein the multicast tree formation module is configured to create one or more multicast trees covering nodes of a NoC interconnect. Trees can be constructed such that no cycles in the tree are formed and nodes at the end of the tree act as leaf nodes. According to one example implementation, multicast message transmission module can be configured to transmit a multicast message from a source node to multiple destination nodes using a multicast tree selected from the set of trees formed by the multicast tree formation module. A multicast message can either be sent to all NoC nodes as and when encountered (which can then be absorbed by actual destination nodes for forwarding to their respective SoC components) or can only be sent to nodes that fall along the edges of the destination nodes mentioned in the multicast message. According to another example implementation, multicast message response module can be configured to allow destination nodes to reply to the multicast message from the source node such that an aggregation node in the NoC interconnect can be configured to aggregate all response messages from the destination nodes and send a single aggregated response message depicting information from all destination nodes to the source node.

The foregoing and other objects, features and advantages of the example implementations will be apparent and the following more particular descriptions of example implementations as illustrated in the accompanying drawings wherein like reference numbers generally represent like parts.

BRIEF DESCRIPTION OF THE DRAWINGS

FIG. 2(b) illustrates three different routes between a source and destination nodes.

DETAILED DESCRIPTION

Figure 1A:
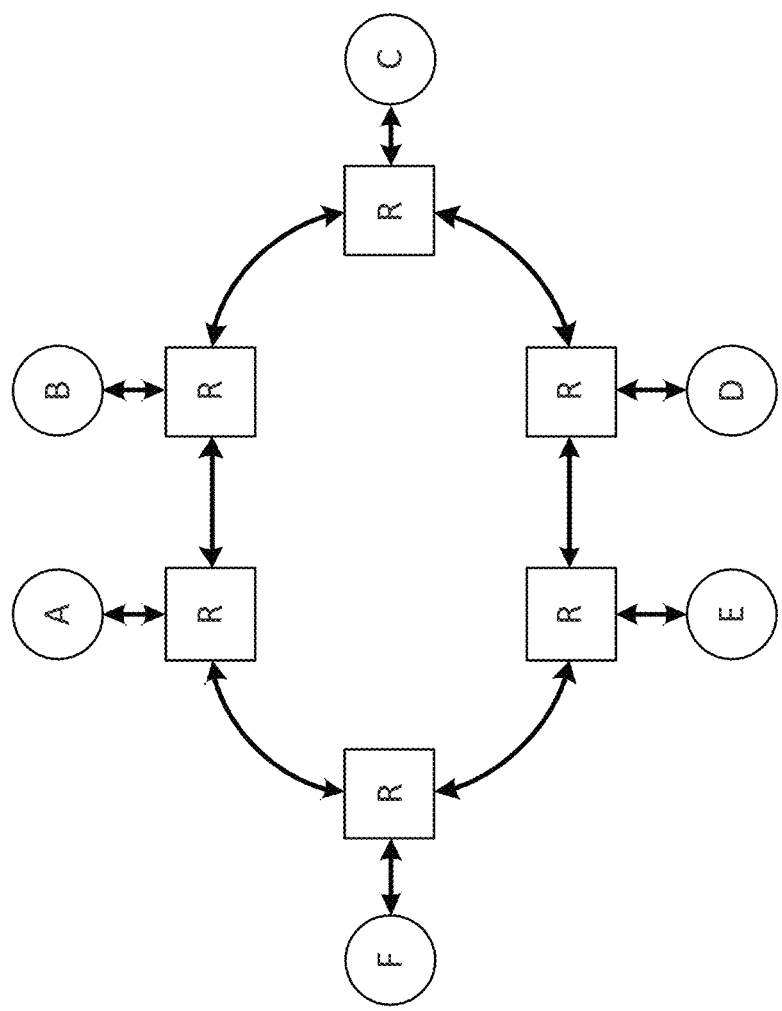
FIGS. 1(a), 1(b) 1(c) and 1(d) illustrate examples of Bidirectional ring, 2D Mesh, 2D Torus, and 3D Mesh NoC Topologies.
Figure 1B:
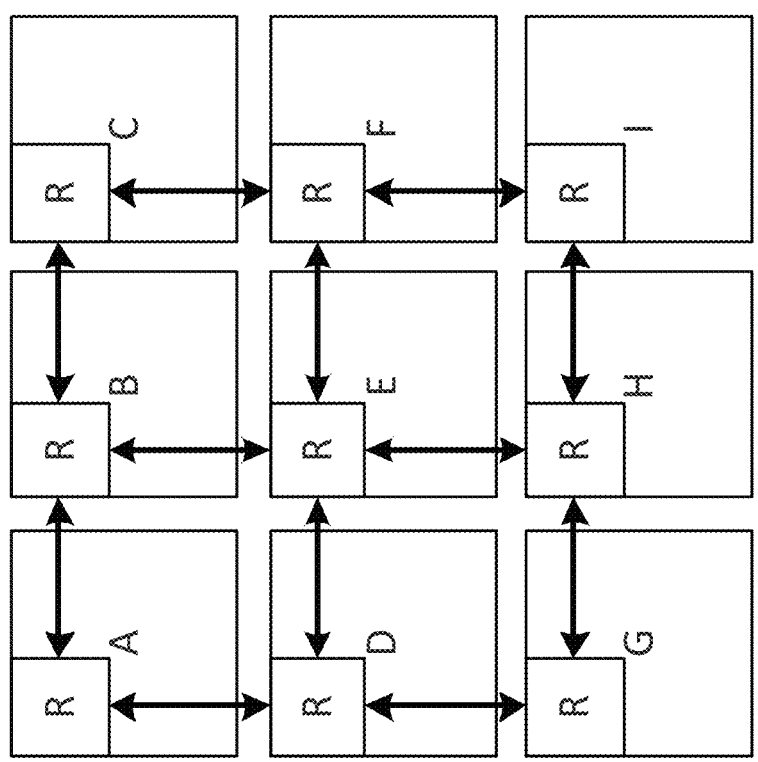
Figure 1C:
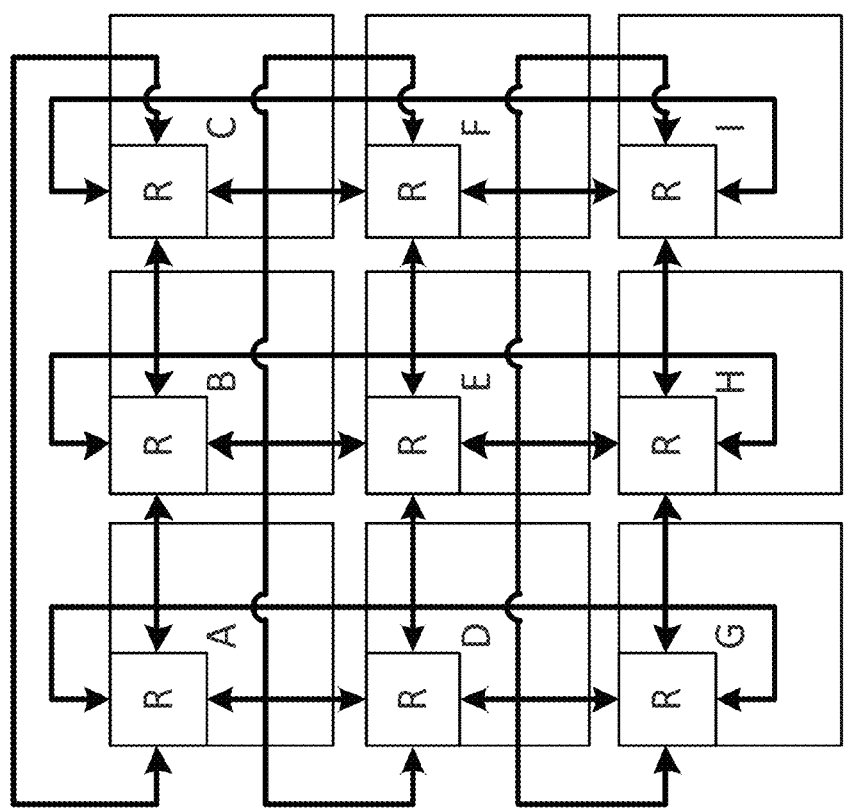
Figure 1D:
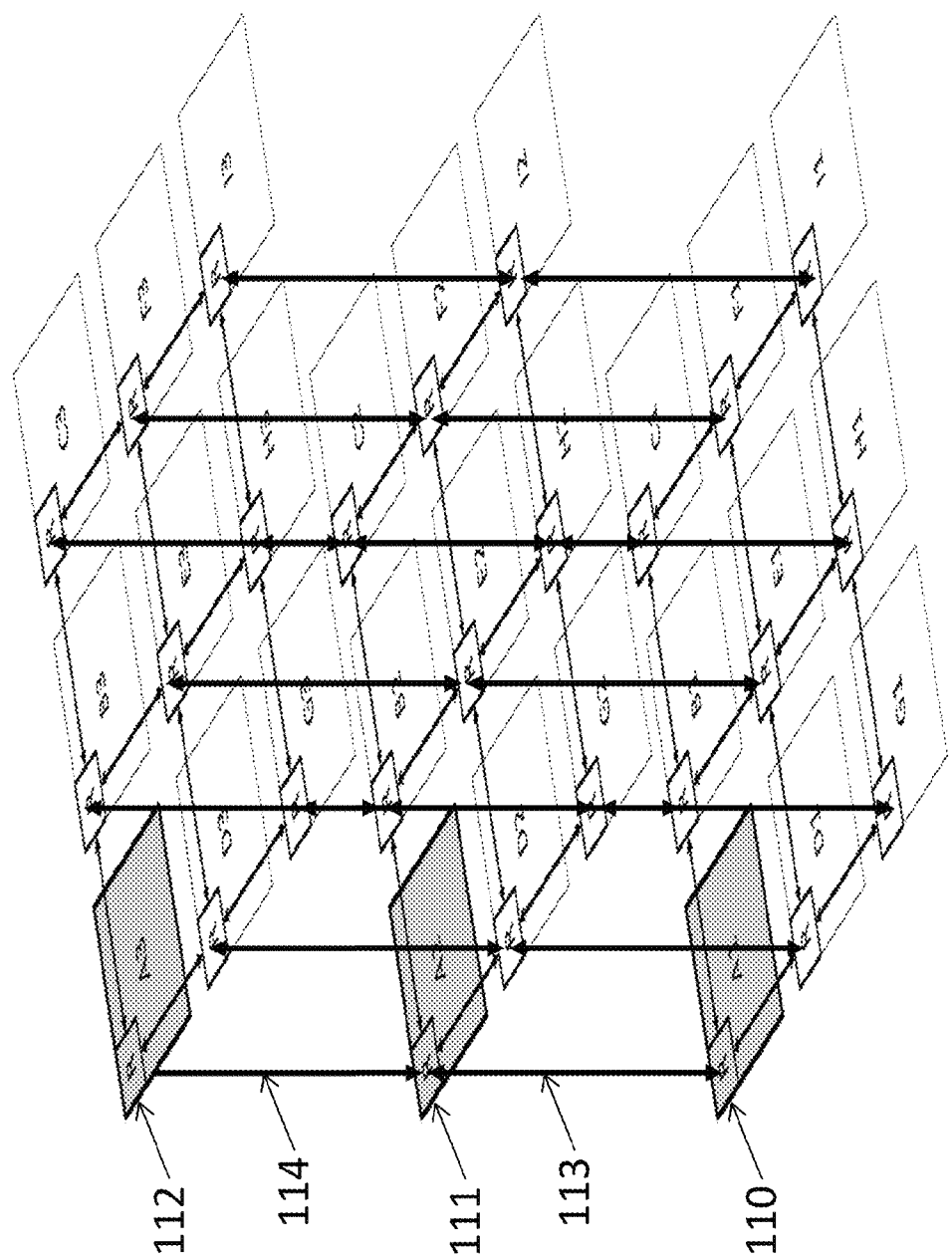
Figure 2A:
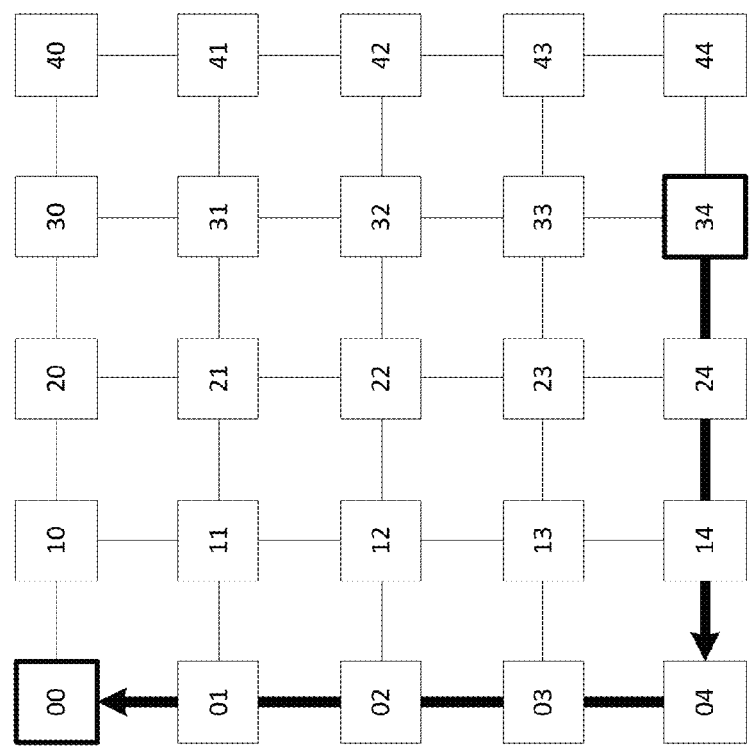
FIG. 2(a) illustrates an example of XY routing in a related art two dimensional mesh.
Figure 3A:
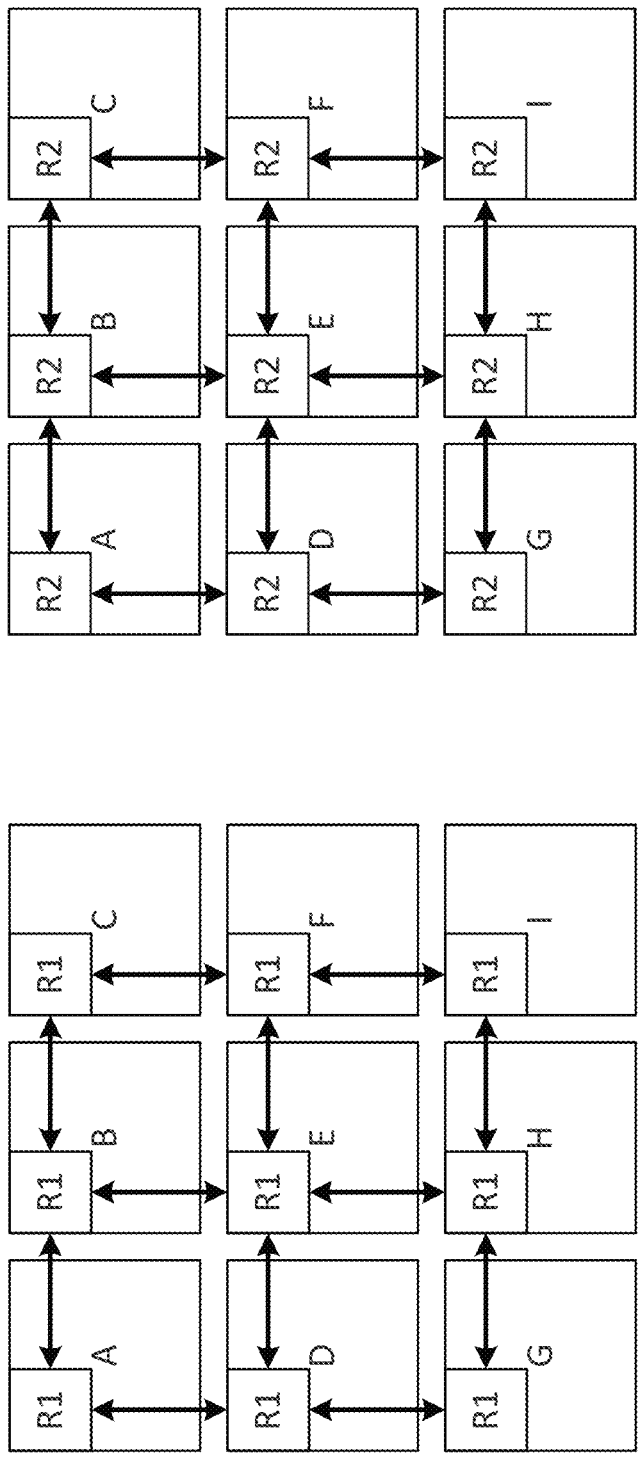
FIG. 3(a) illustrates an example of a related art two layer NoC interconnect.
Figure 3B:
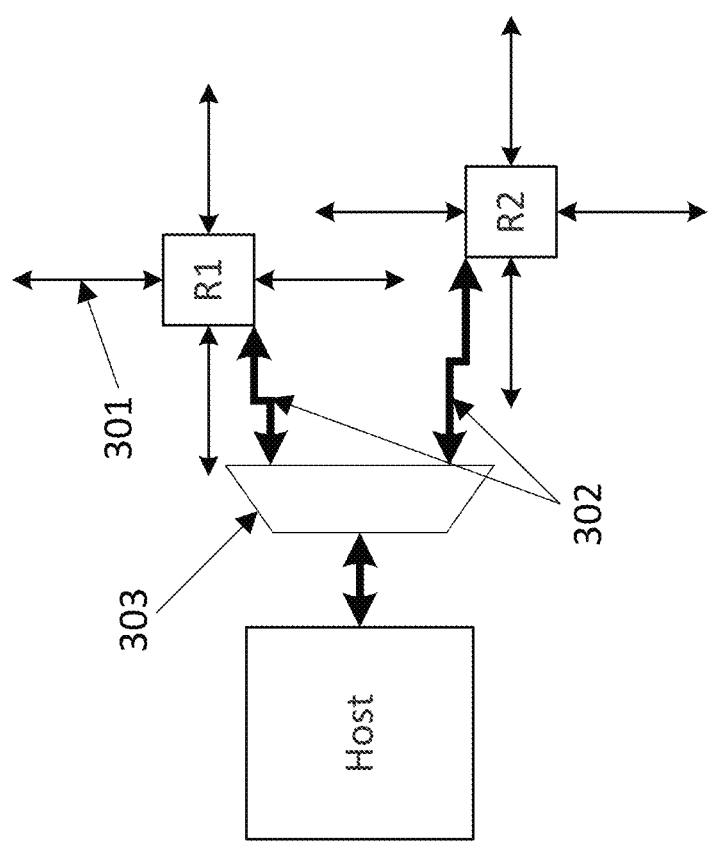
FIG. 3(b) illustrates the related art bridge logic between host and multiple NoC layers.
Figure 4A:
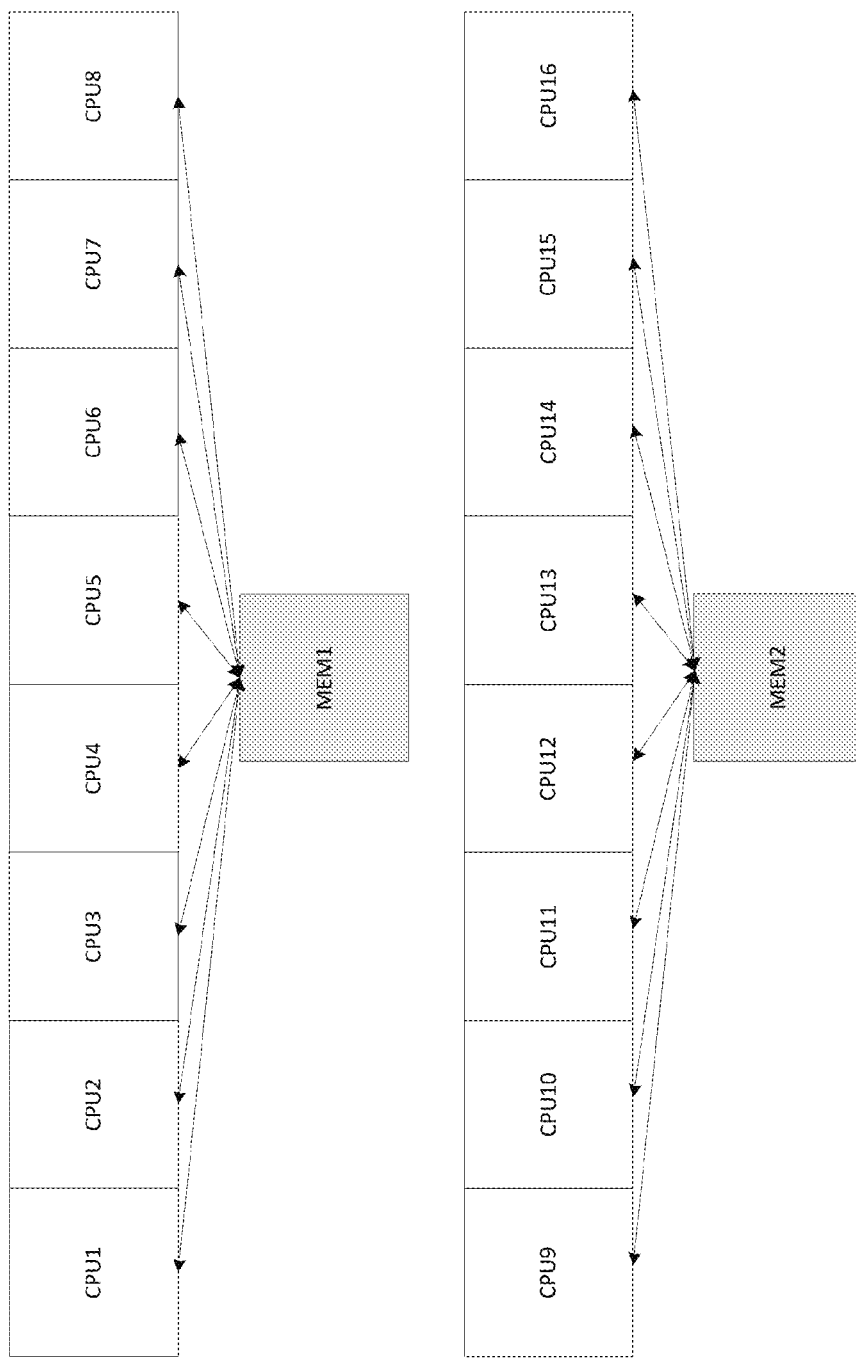
FIG. 4(a) illustrates number of system components and the connectivity between them.
Figure 4B:
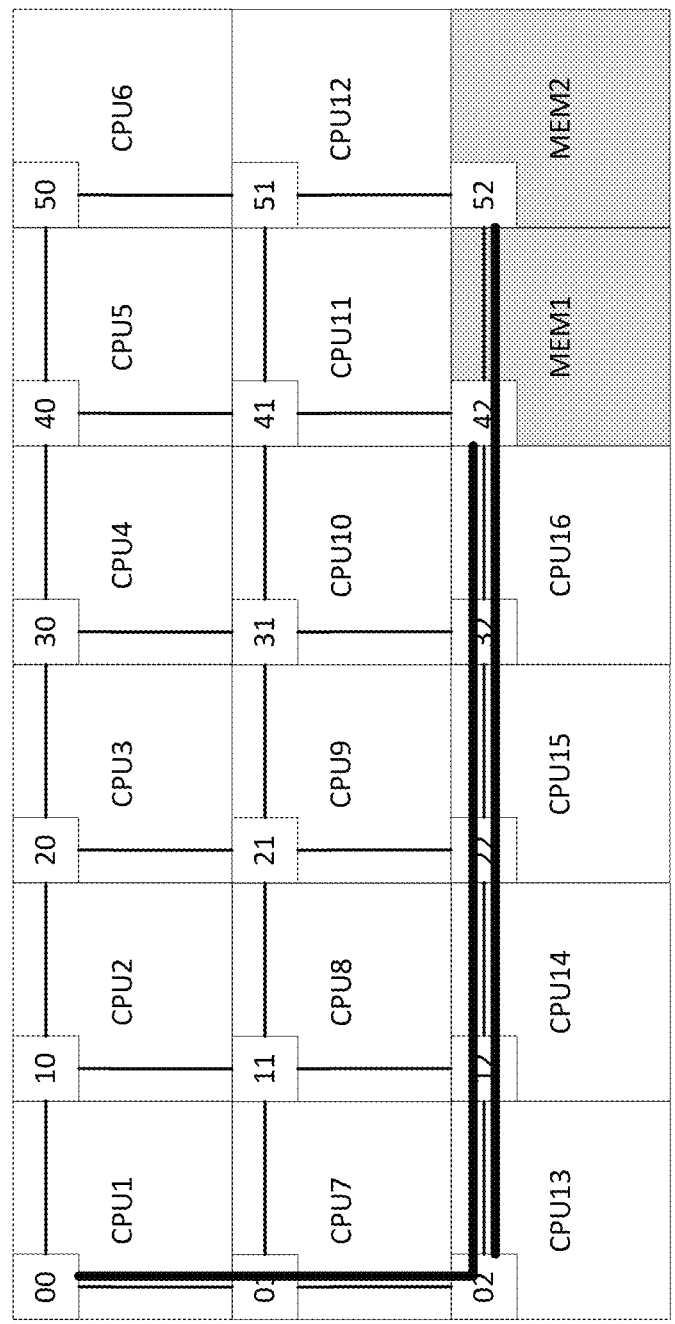
FIG. 4(b) illustrates a sample position of various hosts in a 3×6 mesh NoC topology.
Figure 4C:
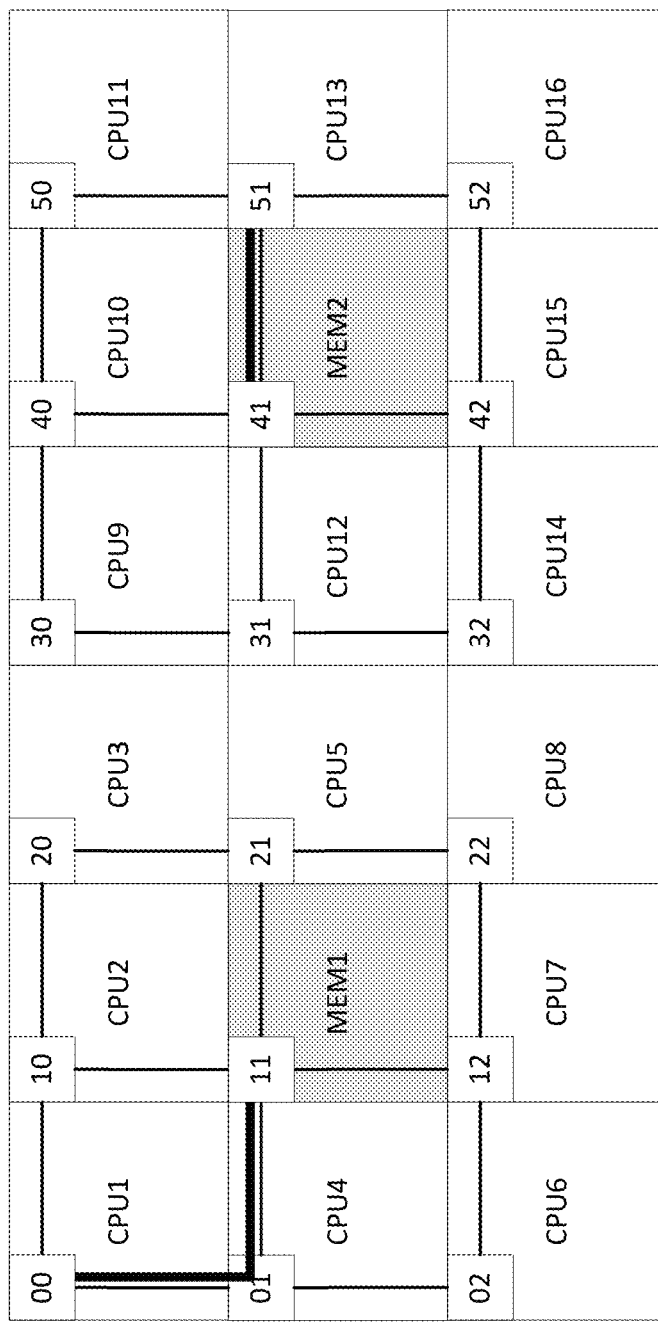
FIG. 4(c) illustrates a better position of various hosts in a 3×6 mesh NoC topology.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application.

Multicast in a NoC topology may provide more efficient delivery of a message to multiple destination components from a source component. The multicast environment is achieved with a transmission of a single message at a source component, which gets replicated in the NoC during routing towards the destination component. Broadcast is an extreme form of multicast where a message is delivered to all destinations in the system and unicast is the other extreme where message is delivered to a single destination. Example implementations are directed to implementing multicast in any given NoC topology, wherein the one or more multicast trees are initially formed using nodes of the NoC topology and then use one of these trees is used to route a multicast message to its intended destination components.

Figure 5A:
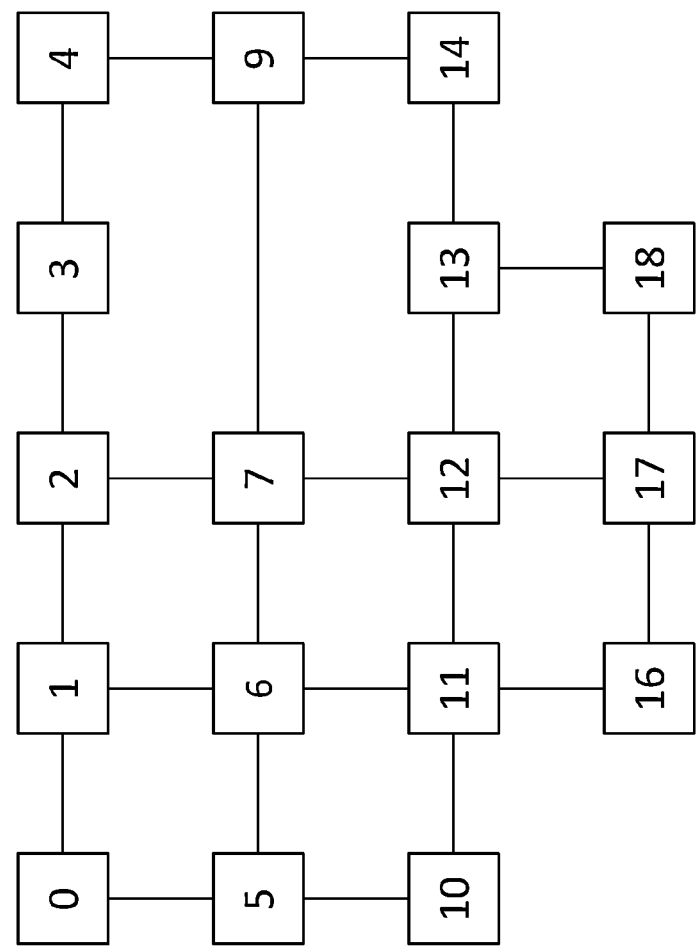
FIG. 5(a) illustrates a connection between nodes of a NoC topology in accordance with an example implementation.

Consider an example NoC topology 500 shown in FIG. 5(a). Squares in FIG. 5(a) indicate NoC routers, also interchangeably referred to as NoC nodes or simply "nodes" hereinafter, and lines between them indicate NoC channels. As illustrated in FIG. 5(a), each node can be configured with multiple ports for bi-directional or multi-directional transmission of message transactions. For instance, ports of node 0 are connected with ports of node 1 and 5. Similarly, ports of node 7 are connected with ports of nodes 2, 6, 7, and 9.

Figure 5B:
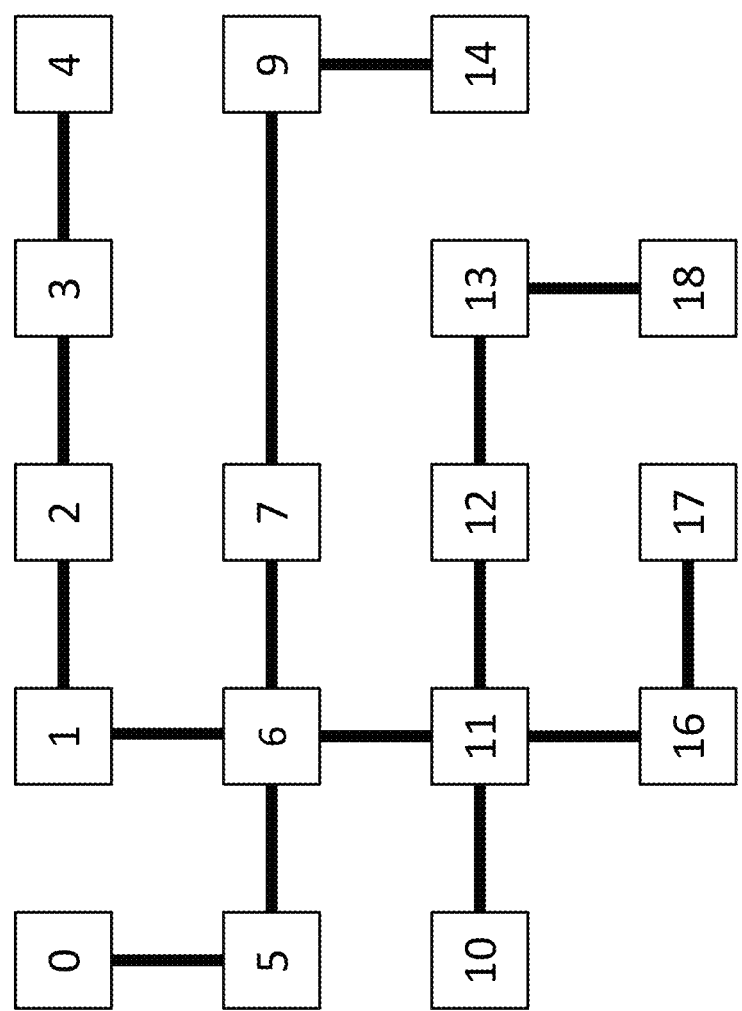
FIG. 5(b) illustrates a formation of a multicast tree traversing through all nodes of a NoC topology in accordance with an example implementation.

In an example NoC architecture, multicast functions can be provided such that any source component can a multicast message to any given set of destination components. According to one example implementation, multicast function can be provided by forming a multicast tree comprising nodes of NoC interconnect such that all nodes of the NoC form part of the multicast tree. An example multicast tree is illustrated in FIG. 5(b). Bold lines between NoC nodes indicate tree edges. Tree edges are a subset of all available NoC channels, and there is no cycle in the tree. The last node on each tree traversal can act as a leaf and therefore, with reference to FIG. 5(b), each of the nodes 0, 4, 10, 14, 17, and 18 are leaf nodes. For each multicast tree, sending a message from a source node to a particular destination node may only be possible through a single route. Therefore, if another route is desired for sending messages across node combination, multiple multicast trees may be formed, as explained below. For illustration of the former case, a message from source node 6 to destination nodes 3, 14, 17 can be sent by sending the multicast messages to 6→1→2→3 for node 3, 6→7→9→14 for node 14, and 6→11→16→17 for node 17. In an example implementation, tree edges can be unidirectional or bi-directional based on the communication requirements. Edges are assumed to be bi-directional, i.e. messages can be routed back or forth along these edges.

According to one example implementation, once a multicast tree is formed and NoC nodes have been configured such that they are aware of the presence of tree edges, multicasting may be more efficiently performed. In an example implementation, a source component injects a multicast message at a NoC node with which it is connected, which acts as a source node. The source node then transmits a copy of this message on each of its multicast tree edge. Subsequently, any NoC node that receives a multicast message sends a copy of the message on all its multicast edges except to the one from which it received the message. For instance, in case the source node 6 sends the multicast message to node 11, node 11 would send a copy of the message to all its edges i.e. to nodes 10, 12 and 16, except sending it back to node 6. Additionally, when the message reaches a NoC node, the NoC node also examines whether the destination set for the multicast message contains any host that is connected to it. For instance, each of the nodes 11, 12, 10, and 16 would assess if the destination node, say node 17, is connected thereto. If it is, it also sends a copy of the message to the ejection ports to which the destination hosts are connected. This process continues until leaf nodes of the multicast trees are reached. In the above example, as the intended destination component was attached to node 17, node 16 would continue to forward a copy of the message to node 17, which would then detect that the intended destination component is connected thereto and accordingly send the message to the component through the respective ejection port. Since there are no cycles in the tree, each NoC node receives the message exactly once. Thus, full broadcast of messages to all nodes of the multicast tree occurs and nodes deliver the received message to the destination hosts connected to it based on the destination address of the message. In alternative implementations, NoC nodes may deliver the message to all hosts connected thereto and hosts may decide to accept the message or drop the message, based on whether the message is destined to it or not.

Figure 5C:
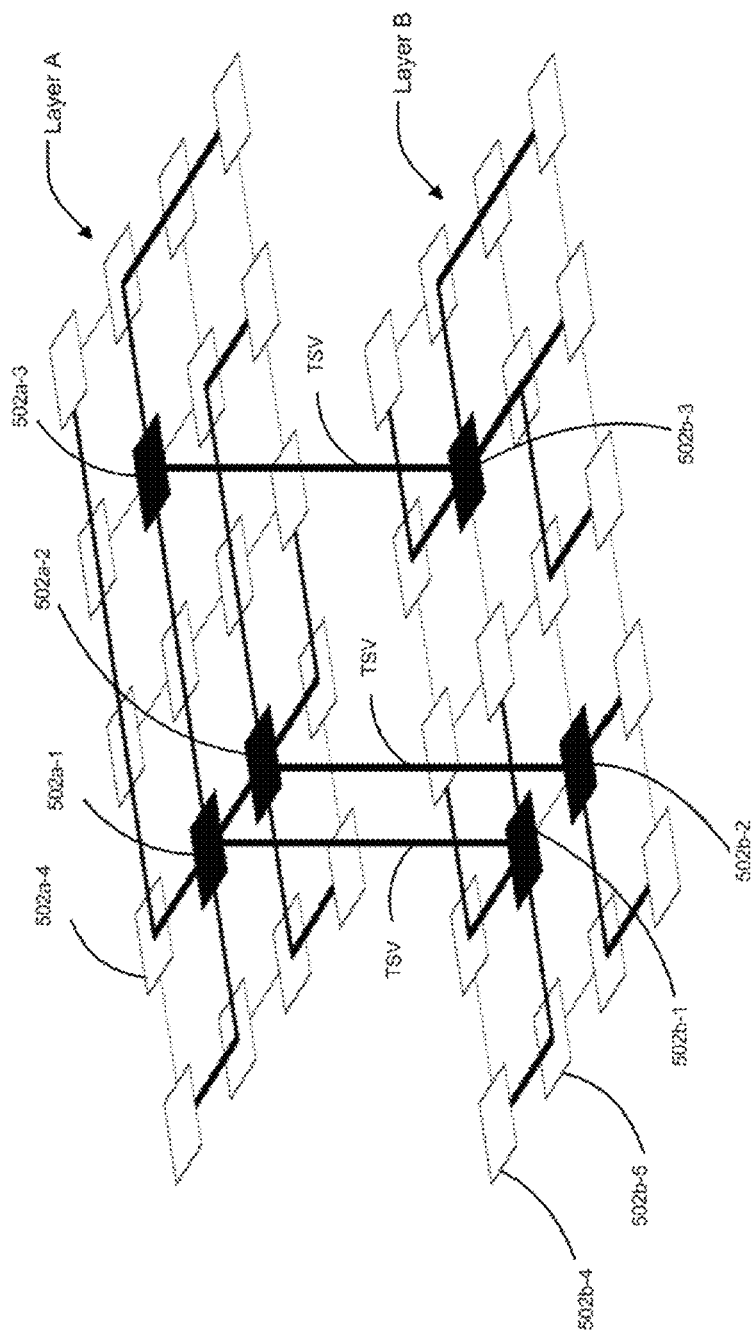
FIG. 5(c) illustrates a formation of a multicast tree in a 3D NoC topology having two layers in accordance with an example implementation.

In an example implementation, the above mentioned tree-based multicasting may be expanded to 2.5D or 3D interconnects by expanding the multicast tree to multiple NoC layers at each silicon layer. An example is shown in FIG. 5(c), where 3D NoC is used to connect components of a chip that has two silicon layers. Here, a 2 layer NoC is used for each of the chip layers, and connectivity between the two NoC layers is available with Through Silicon Vias (TSVs). A single multicast tree spans both silicon layers and certain edges of the tree traverse along the TSVs between the two silicon layers as the end points of the edges are on different silicon layers. This multicast tree can be used to provide a multicast connection between all nodes of the NoC, which span across the two silicon layers. As can be seen in FIG. 5(c), the illustration comprises two NoC layers, namely Layer A and Layer B, each having 20 nodes, wherein each node has one or more ports through which it connects to one or more SoC components. Nodes 502a-1, 502a-2, and 502a-3 on layer A can be operatively coupled with nodes 502b-1, 502b-2, and 502b-3 on layer B through multiple TSV's. Furthermore, by using these nodes a multicast tree can be constructed on each layer of the NoC interconnect. For example, if node 502b-4 on Layer B needs to send a message to node 502a-4 on layer A, the message can be sent through the route 502b-4→502b-5→502b-1→502a-1→502a-4. Using the same structure and flow of the multicast trees on the respective layers, one or more multicast messages can be transmitted.

The 2.5D and 3D NoC architecture can also scale to more than two silicon and NoC layers in which case a multicast tree can span across all silicon and NoC layers. In the above-described example, the hosts on a silicon layer are assumed to be directly connected to NoC nodes at the same layer. However, in alternate example implementations, TSVs can be used to connect hosts at one silicon layer to NoC nodes at another silicon layers. The TSVs can behave just like any other NoC channel on the same layer.

Figure 6A:
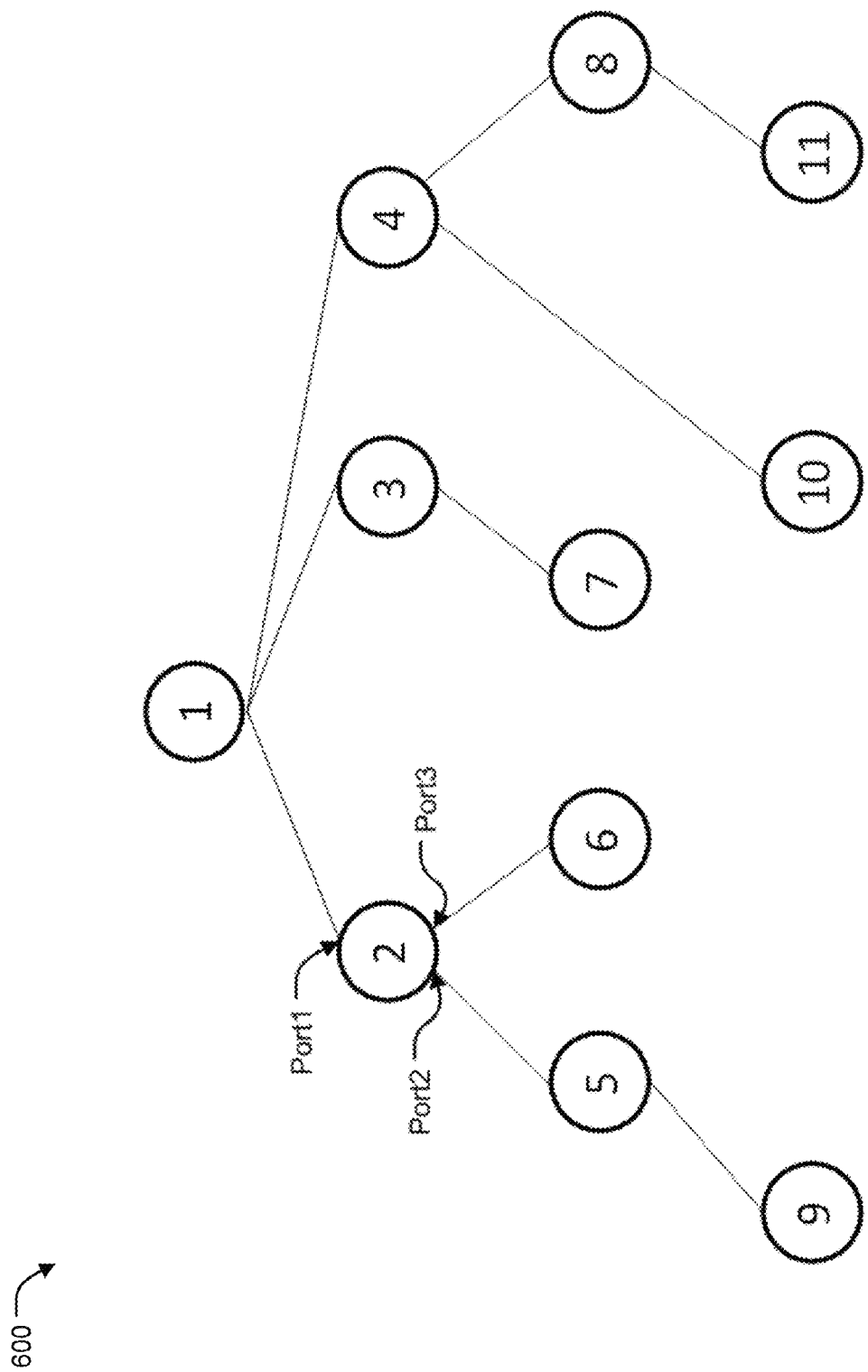
FIG. 6(a) and FIG. 6(b) illustrate message traversal along a multicast tree with and without filters in accordance with an example implementation.

FIG. 6(a) illustrates message traversal along a simple multicast tree in accordance with an example implementation. The example multicast tree of FIG. 6 is not based on the tree formed in the example of FIG. 5. Any node of the NoC interconnect can be configured as the root node so as to facilitate formation of the tree. In an example implementation, the most common source node can be selected as the root node, whereas in another example implementation, the source node for any message transaction can by default be selected as the root node. In another example implementation, the source node can also be a part of the tree and does not necessarily need to be the root node. For example, as illustrated in FIG. 6(a), a SoC component attached with node 3 can be the source component, making the node 3 as the source node for the respective multicast message. Each source node can reach any destination node through a single link/route.

FIG. 6(a) further illustrates a node 2, which has three available channels that are part of the multicast tree and mapped with the node 2 through three ports namely, port1, port2 and port3. Port1 of node 2 connects the node 2 with node 1, port2 connects node 2 with node 5, and port3 connects node 2 with node 3. In an example implementation, when node 2 receives a message at port1 from node 1, node 2 transmits the message to port2 and port3, and not back to port1 as this port 1 is the source of the message. Nodes and/or ports thereof can also be intelligently configured to select a multicast message to be sent for onward transmission down the tree based on the destinations that the message is to be sent and the nodes to which the current node connects.

In an example implementation, when the set of destinations in a multicast message involves sending the message to only a small subset of nodes (that the set of destinations correspond to), a filter may be incorporated to allow evaluation of the multicast message and allow the message to pass through only if it fulfills one or more defined criteria. Such criteria can be based on the set of destinations that the message needs to be sent to and determination of whether one or more destinations of the set of destinations are reachable from the current node. For instance, in case a multicast message is intended for destination components that are attached to nodes 6, 8, and 10, a copy of the message received at node 2 can be evaluated to determine the intended destination nodes and whether one or more of the nodes (6, 8, and 10) are reachable from the current node 2. In the example of FIG. 6(a), node 6 is reachable from node 2 and therefore, instead of copying the message at node 2 to both port2 and port3, the message may be sent to port3 alone. Filters that compare the intended set of destination nodes with the nodes that the current node can serve can be implemented at each node, and also on each port of the node. For instance, a filter at port3 of node 2 would indicate that it can only serve messages that are intended for node 6, whereas a filter at port2 of node 2 would indicate that it only serve messages that are intended for nodes 5 and 9. In another example implementation, filters can be implemented for a subset of nodes and ports thereof and not on all the ports/nodes. For instance, filters may not be needed at the leaf nodes, as the very reason a multicast message has reached a leaf node indicates that the message was intended for the node.

Figure 6B:
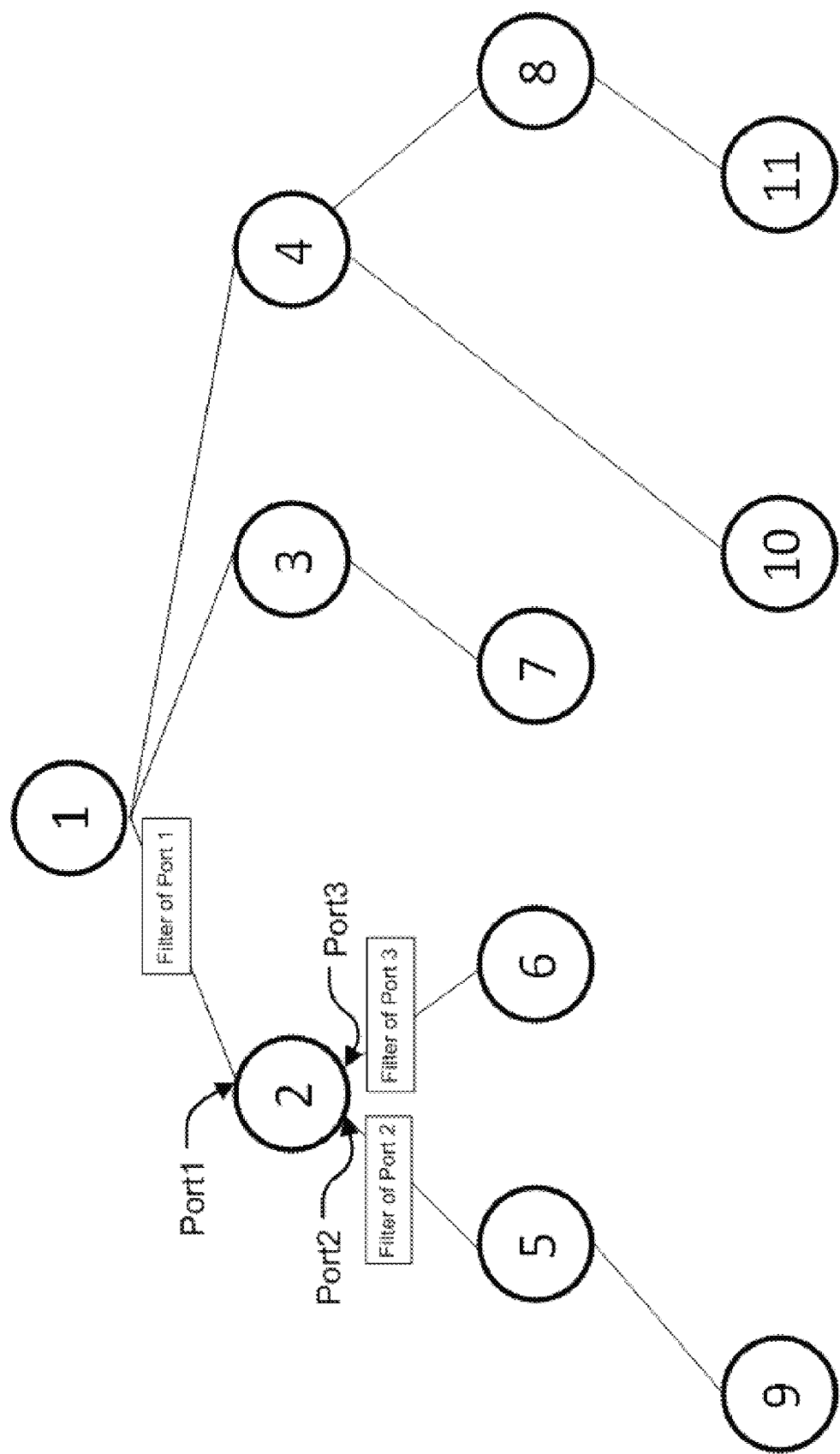

FIG. 6(b) illustrates an example representation of filters configured at ports of a node. As each port is operatively connected to a different set of further nodes and therefore to a different set of components, filter definition of each filter at each port is different. These filters are configured and designed so that they can decide correctly whether to forward a multicast message to a channel based on the destinations for the message. In an instance, in a multicast message that originates from source node 3, the message can be filtered at the set of filters implemented in node 3 itself before being transmitted to further nodes. For instance, when there are two ports in node 3, (e.g., one that connects with node 1 and the other that connects with node 7) a check can be done to assess whether the destination nodes are reachable through any of the nodes. If the destination nodes are 10 and 11, the message can only be sent to node 1 through the respective port of node 3. Once the message is received at node 1, a determination is made as to which ports can lead to destination nodes 10 and 11, and accordingly the multicast message is only sent to node 4 and not to node 2.

In an alternative example implementation, the filter can also be implemented at a node level, wherein the node level filter identifies the destination nodes intended to be reached in the multicast message and determines whether a set of such destination nodes can be reached through the node in context. For instance, with reference to FIG. 6(a), if a node level filter is implemented in each node, say node 2, and a message intended for nodes 3, 4, and 6 comes to node 2, the filter can determine that node 6 can be reached through node 2 and therefore shall forward the message to all ports of node 2 except to the port receiving the message.

By implementing filters at a port level, transmission of unnecessary messages may be prevented. For example, if a filter is implemented at ports 2 and 3 of node 2, as illustrated above with reference to FIG. 6(b), the message would not be sent through port 2, which may thereby save channel bandwidth.

In an alternative example implementation, as each SoC component is connected with a NoC router/node through a port, each source node incorporates a source port from which the first message is initiated. Filtering each multicast message at the respective source port may help optimize the tree traversals that need to be conducted for reaching the desired set of destination nodes. For example, with reference to FIG. 6(b), the filter of port1 of node2 can be configured to check the destinations mentioned in the multicast message and accordingly route the message. If the destinations are nodes 5 or 9, the message can be copied to port2, whereas in the destination is node 6, port3 is forwarded the message. Similarly, for a message received at the filter of port2, if the destination in the message indicates nodes 1, 3, 4, 7, 8, 10, or 11, the message can be copied and sent on port1 of node 2, whereas if the message indicates node 6, the message is copied and sent on port3 of node 2. Likewise, for a message received at the filter of port3 of node 2, if the destination in the message indicates nodes 1, 3, 4, 7, 8, 10, or 11, the message can be copied and sent on port1 of node 2, whereas if the message indicates nodes 5 or 9, the message is copied and sent on port2 of node 2.

Figure 7:
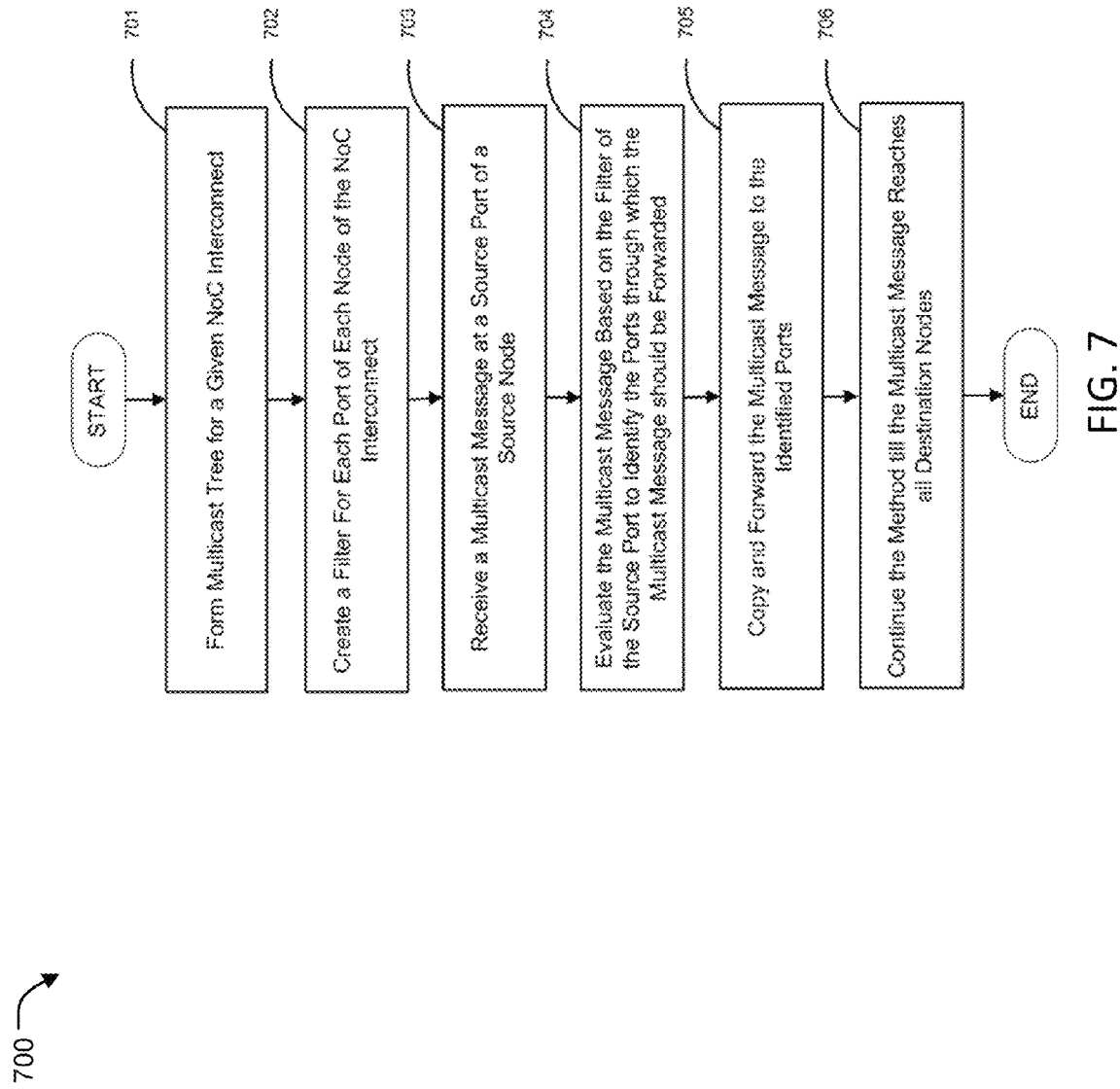
FIG. 7 illustrates a flow diagram for implementing and operating filters in one or more ports of NoC nodes in accordance with an example implementation.

FIG. 7 illustrates a flow diagram 700 for implementing and operating filters in one or more ports of NoC nodes. At 701, a multicast tree is formed for a given NoC interconnect having a plurality of nodes. At 702, a filter is created for each port of each node, wherein the filter defines and configures the destination nodes for which the respective port can process the multicast messages and allow the messages to pass through. At 703, a multicast message is received at a source port of a source node, wherein the multicast message includes a set of destination nodes to which the message is to be delivered. At 704, the source port evaluates the multicast message (including the set of desired destination nodes) based on its respective filter to identify the port(s) through which the multicast message should be sent so as to reach the destination nodes. The multicast message is not forwarded to the other ports that are not in the route of the destination nodes. At 705, the multicast message is copied and forwarded to the identified ports. At 706, the flow is repeated until the message reaches all the destination nodes.

Figure 8A:
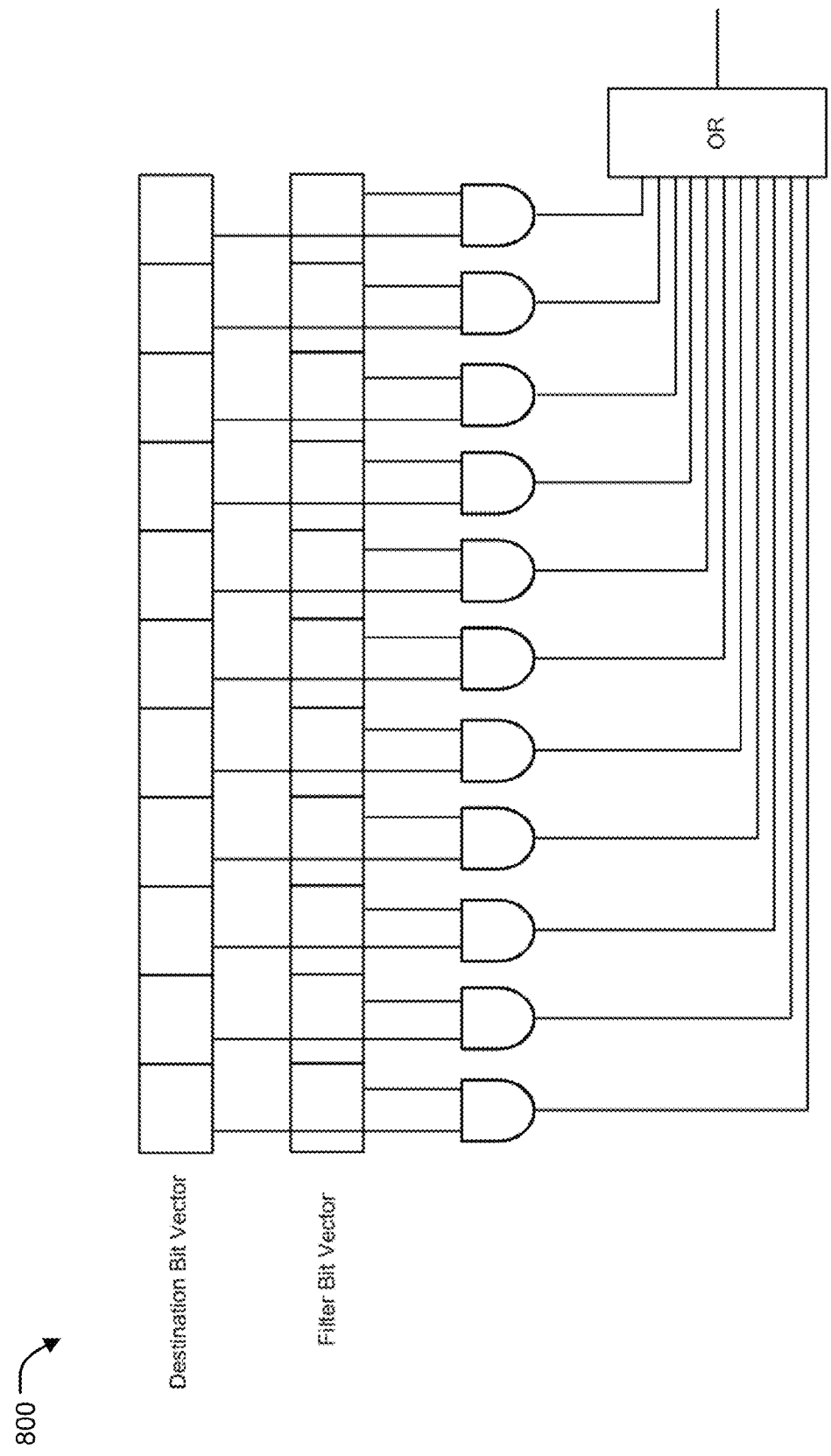
FIG. 8(a) and FIG. 8(b) illustrate example implementations of filter logic.

FIG. 8(a) illustrates an example implementation of filter logic 800. In the present example implementation, all possible destinations (or a subset of them) of a multicast message can be encoded efficiently by a destination bit vector, wherein each bit indicates a destination node. For instance, if there are a total 64 possible destinations for a multicast message, the destination set can be a 64-bit vector, where each bit indicates one of the 64 destinations. When a bit is set, the bit indicates that a given multicast message is or is not destined for the corresponding destination. With this encoding, any arbitrary set of destinations can be specified.

FIG. 8(a) also indicates a filter bit-vector for one or more ports of a node. The filter bit-vector can be of the same length as the destination bit-vector, wherein the filter bit-vector indicates whether the corresponding destination bit in the destination bit-vector is to be filtered or not. Filter bits are set at an edge at a node based on which destinations are present in the multicast tree along the other edges of the node. For example in FIG. 6(b), the filter of port1 of node 2 will have three bits set for the destination nodes 5, 6 and 9 as these are the destinations that are present along the other two edges at node 2. Similarly, the filter at port 3 of node 2 would have only one bit set for node 6 such that filter 3 allows messages to pass through only when the multicast message has one of its destination nodes as node 6. On similar lines, the filter of port2 of node 2 would have two bits set for nodes 5 and 9. Furthermore, as illustrated in FIG. 8(a), output from the destination bit-vector and the filter bit-vector can be processed through an AND circuit such that only for bits where the destination as well as the filter bits are SET (1), output from the AND processing is SET. Once all the bits are processed through the AND gate, the combined output can be processed through an OR circuit to check if any bit is set and needs to be forwarded. If a bit is set, the port from which that bit would go through would be extracted and the message is passed on accordingly. The above example implementation of a filter design can also be substituted by any other circuit or logic to process multicast messages and evaluate ports through which the multicast messages need to be forwarded.

Figure 8B:
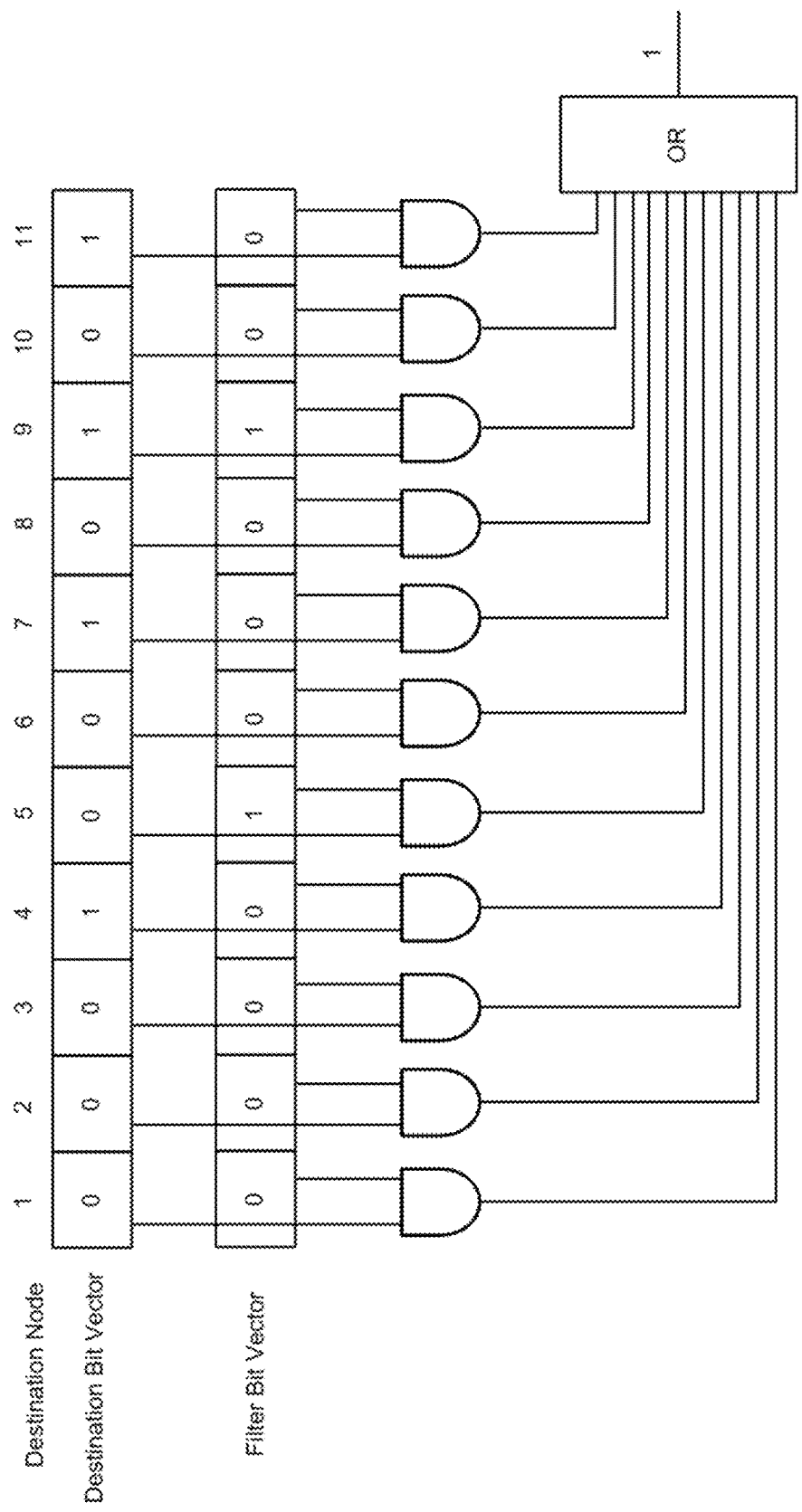

FIG. 8(b) shows an example set of completed filter bit-vector for port2 of node 2. The destination bit-vector of this example is assumed to be set for destination nodes 4, 7, 9, and 11. The filter bit-vector is defined for port2 of node 2 and only set for nodes 5 and 9. As node 9 is one of the nodes to which the multicast message is to be transmitted, output from the AND operation between the destination bit-vector and the filter bit-vector would be 1 for bit 9 and the message would therefore be allowed to go through port2 of node 2 to node 5.

In an example implementation of a finer grained filter design, multiple bit vectors can be used for each pair of input and output channels at a node as filter and filtering is performed independently for every outgoing channel to determine if the incoming message is sent on the output channels or not.

In an example implementation, instead of using a single multicast tree, multiple multicast trees may also be generated and used for multicasting messages. For instance, in a NoC topology, multiple multicast trees may be formed, each with a different shape and size, and NoC nodes may be configured such that they are aware of the presence of one or more of the multicast trees. Subsequently, when a multicast message needs to be sent, the source SoC component can determine the multicast tree that is to be used for the respective message, and accordingly inject the message into the NoC along with the indication of the chosen multicast tree. Once the message has been sent, NoC nodes can traverse the message along the chosen multicast tree edges. In an example implementation, multicast tree selection may also be performed by NoC nodes. In another example implementation, NoC interconnect architecture may also allow messages to hop between different multicast trees.

Figure 9:
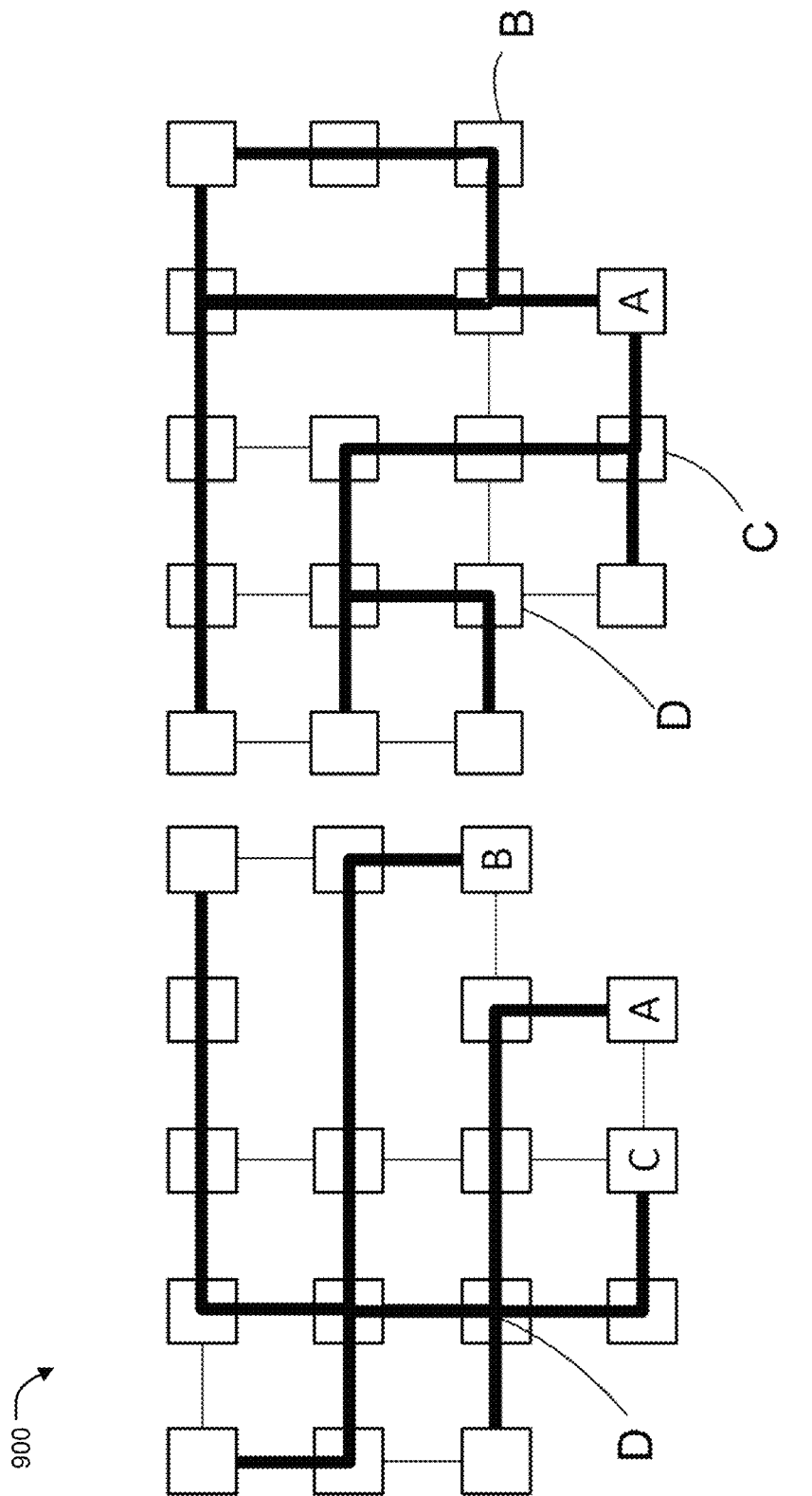
FIG. 9 illustrates two multicast trees in a NoC topology in accordance with an example implementation.

FIG. 9 illustrates two multicast trees 900 in the NoC topology of FIG. 5. These two multicast trees are different in shape, and message delivery through these multicast trees may have different performance implications. Example implementations may consider parameters such as latency, bandwidth utilization, current activity factor, among other like attributes to determine an appropriate tree for a message.

According to one example implementation, when there are multiple multicast trees available, there may be a need determine which multicast tree to opt for a given multicast message for efficiency. For instance, with respect to FIG. 9, for a multicast message from source node A to destination nodes B and C, the two multicast trees may have entire different characteristics. In multicast tree 1, latency from node A to node B is 8 node hops, and to node C is 5 node hops, while in tree 2, the latency is 2 hops each from node A to node B and node C. Thus, tree 2 may optionally be used for this multicast message. Similarly, for reaching a node D from node A, tree 1 requires a fewer number of hops and may therefore provide superior latency performance.

Example implementations may dynamically determine which multicast tree to take for a given multicast destination set. For instance, each NoC node may contain information about the distances from itself to all other nodes along each multicast tree that traverses the node. Based on the set of destination nodes of a multicast message and the distance information, the node may compute the total distance traveled by this message in each multicast tree before message is delivered to all destinations. Based on the results, a tree with smallest total distance may be selected for that message from the node. The tree selected by a given node therefore would depend on the multicast message in context.

Figure 10:
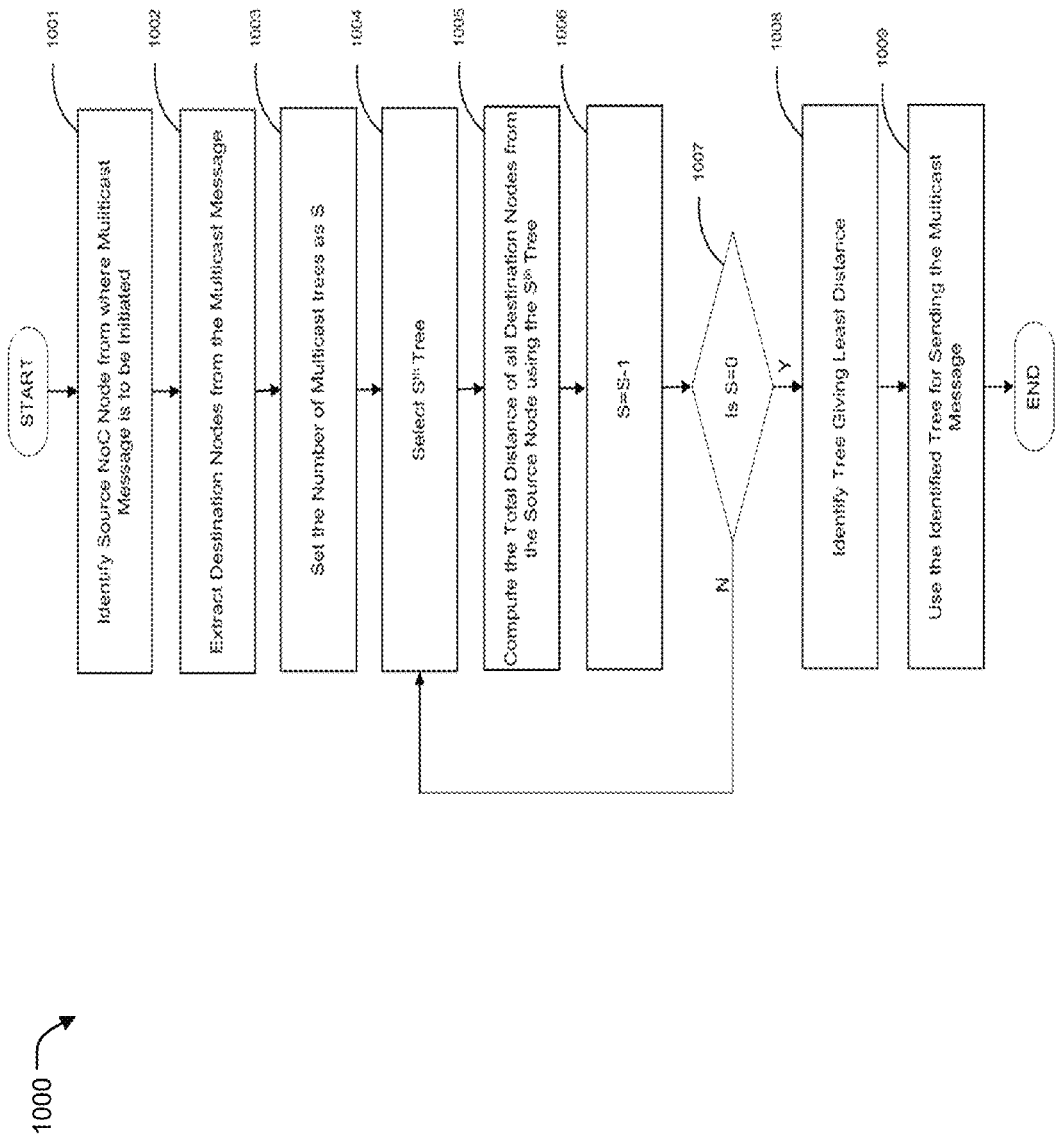
FIG. 10 illustrates a flow diagram for automatically selecting a multicast tree from a set of multicast trees in accordance with an example implementation.

FIG. 10 illustrates a flow diagram 1000 showing steps for automatically selecting a multicast tree from a set of multicast trees based on distance traversed, in accordance with an example implementation. At 1001, a NoC source node from which a multicast message is to be initiated is identified. As the selection of a multicast tree from a set of trees depends on the source node in context and the number of destinations to be covered in the message, the flow at 1001 would need to be computed dynamically as soon as a multicast message is ready to be transmitted by a SoC component. At 1002, from the multicast message that is to be initiated, all destination nodes that need to be covered are extracted. At 1003, the total number of multicast tree available can be set at S. At 1004, the S'th tree is selected. At 1005, the total distance from the source node to each destination node using the S'th tree is computed. In an example implementation, the distance can be computed based on the number of hops, the amount of time taken, the amount of bandwidth consumed or any other parameters. At 1006, the counter of S is decremented by 1 such that S=S−1. At 1007, a check is performed to determine whether the value of S=0. If the value of S=0 (Y), the flow proceeds to 1008, wherein the tree giving the lowest distance is selected as the final multicast tree that would be used for the respective multicast message to be sent from the source node at 1009. If the value of S is not equal to 0 (N), the flow returns back to 1004.

Alternative example implementations for selection of a multicast tree from a set of trees may consider other parameters such as load factor, available bandwidth at various channels of the trees, latency, network situations and status, preconfigured load balancing schemes, ordering requirements, among other attributes. For instance, if there is a requirement of strict ordering between certain nodes, all messages that have one of these nodes in the destination set must use the same multicast tree. Quality of Service (QoS) of multicast messages and QoS properties of various channels of the multicast trees may also play a role in the tree selection. Finally, deadlock avoidance may also be considered in multicast tree determination as taking certain multicast trees for certain destinations and sources may not be deadlock free and these trees must be avoided for such multicast messages.

According to one example implementation, in a NoC architecture that allows multiple multicast trees to be generated and used, the shape and size of these trees should be determined to maintain high efficiency. In an example implementation for creating multiple trees, assume that there are n nodes in a NoC and that up to m multicast trees can be constructed, where m≤n. A minimum spanning tree is initially constructed and rooted at each node of the n nodes such that, for a given node i, the minimum spanning tree will ensure a minimum distance to all NoC nodes from node i along the tree. There are n trees constructed, with each tree being more optimal in terms of latency for one NoC node. From among the n trees, all possible subsets of the m trees are formed such that there are $^nC_m$ such subsets. Each subset is processed to determine whether the m trees in the subset are the m multicast trees that should be constructed. To determine this, the edges of the m trees are merged in a subset and combined to form a single tree. The quality of the formed tree can be computed by using a function $f$, which would help assess the quality of the subset. The process is repeated for each subset, and the subset with the highest quality is selected based on function $f$, such that the m trees in the subset are the m multicast trees.

According to one example implementation, the quality function $f$ can be defined in a number of ways based on optimization objectives. For instance, if the evaluation parameter for the multicast trees is to assess trees that minimize the maximum latency, $f$ may be the diameter of the tree, i.e. the maximum distance between any two nodes in the tree. On the other hand, if the evaluation parameter is to minimize the average latency, then the average latency along the tree path may be computed between all pairs of nodes using the following formula, $f=\Sigma d(\text{node-i}, \text{node-j})$, for all i, j<n and i≠j;
where, d(i, j) is the distance between nodes i, and j in the tree.

Figure 11:
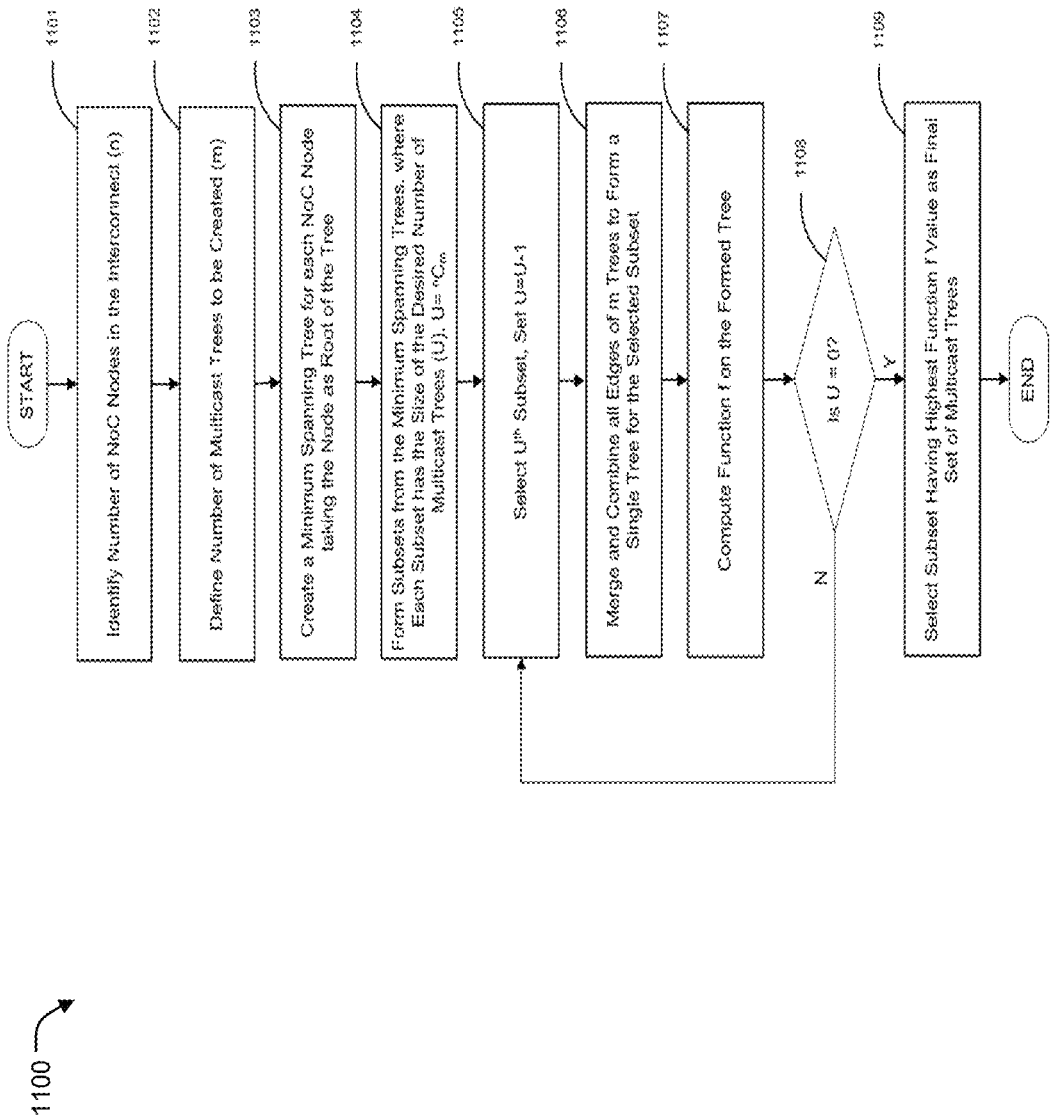
FIG. 11 illustrates a flow diagram for creating multiple multicast trees in accordance with an example implementation.

FIG. 11 illustrates a flow diagram 1100 for creating multiple multicast trees in accordance with an example implementation. At 1101, number of NoC nodes using which the multicast trees are to created is identified. For reference, the total number of nodes is n. At 1102, the desired number of multicast trees to be created is defined. For reference, the desired number of multicast trees is m. At 1103, a minimum spanning tree is constructed for each node such that the node in context is treated as the root of the tree. The flow at 1103 results in the same number of trees as the number of NoC nodes. At 1104, from the total number of trees (n) formed, all possible subsets of desired number of multicast trees (m) are formed such that there are a total of $^nC_m$ subsets. For reference, the total number of subsets being formed is referred to as U.

At 1105, the U'th subset is selected and then the value of U is decremented by 1 to give U=U−1. At 1106, for the selected U'th subset, all edges of m trees in a subset are merged and combined to form a single tree. At 1107, a computation function f is computed on the formed tree and the value is stored in memory corresponding to the selected subset. At 1108, a check is performed to determine if U=0, wherein in case U is not equal to 0 (N), the flow proceeds back to 1105, where the next subset is picked up. If the value of U is equal to 0 (Y), at 1109, a subset having the highest function f value is selected and its m trees are selected as the final set of multicast trees.

Different quality functions, parameters, or methods to construct different multicast trees can also be utilized. For instance, one may determine how many multicast trees are needed in a NoC based on certain goals such as maximum or average latency. In such designs, starting from a single optimal multicast tree, an increasing number of optimal multicast trees may be constructed continuously until the requirements are met.

According to one example implementation, when a single multicast tree is used, a single virtual channel may be assigned to it in NoC designs, wherein the virtual channel switching is not allowed within the NoC. In another alternate example implementation, in order to avoid deadlock and maintain QoS, multiple virtual channels may also be used for a single tree, and different messages may use different virtual channels based on the source, destination, and QoS policy of the message. When multiple physical NoC networks or layers are available, any number of them may be used for the multicast tree. In such a case, various messages may use different physical NoC layers even though they follow the same multicast tree. In another example implementation, when multiple multicast trees are used, any combination of subsets of available virtual channels or physical NoC layers may be assigned to these trees. In such a case, the first multicast tree can be determined for a given multicast message and then the virtual channel and physical NoC layers are selected.

Another example implementation may allow different multicast trees to span across different sets of nodes. In such a case, based on the destination address of a multicast message, the appropriate tree can be selected. One may also allow switching between multicast trees for a single multicast message in the NoC.

Multicasting can be important for maintaining high performance and efficiency when a single source sends identical message to multiple destinations. In many systems however, for every multicast request message, there are response messages as well, and each response message may differ from the other messages only over a few bits. These response messages can be like the inverted multicast messages from multiple sources to one destination. Unfortunately, the inverted multicast is generally inefficient as a destination agent needs to receive each copy of the message separately, which can dramatically reduce the performance and increase latency. The example implementations may therefore facilitate more efficient implementation of such inverted multicast messaging. In an example implementation, when multiple sources send messages to a destination such that each message differs from the other over only few bits, the NoC may combine these messages into one while keeping information of all messages as they are routed towards the destination. If all messages are combined then the destination receives a single message. For instance, if node 1 initially sent a multicast message to nodes 2, 3, 4, and 5, responses from these destination nodes 2, 3, 4, and 5 can be combined into a single message, with the differing part of each response message from the four nodes staying intact. During such a response stage, the earlier destination nodes become source nodes and the earlier source node becomes the destination node such that the ratio of new source nodes to destination node is "many to 1".

Figure 12A:
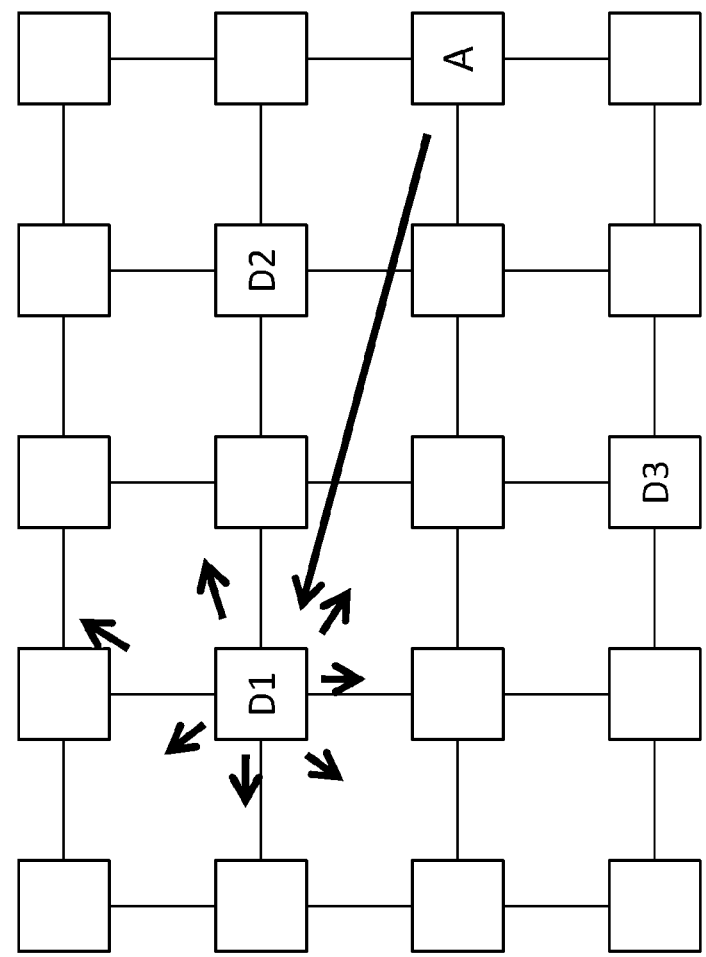
FIG. 12(a) and FIG. 12(b) illustrates distribution and aggregation of multicast messages in accordance with an example implementation.
Figure 12B:
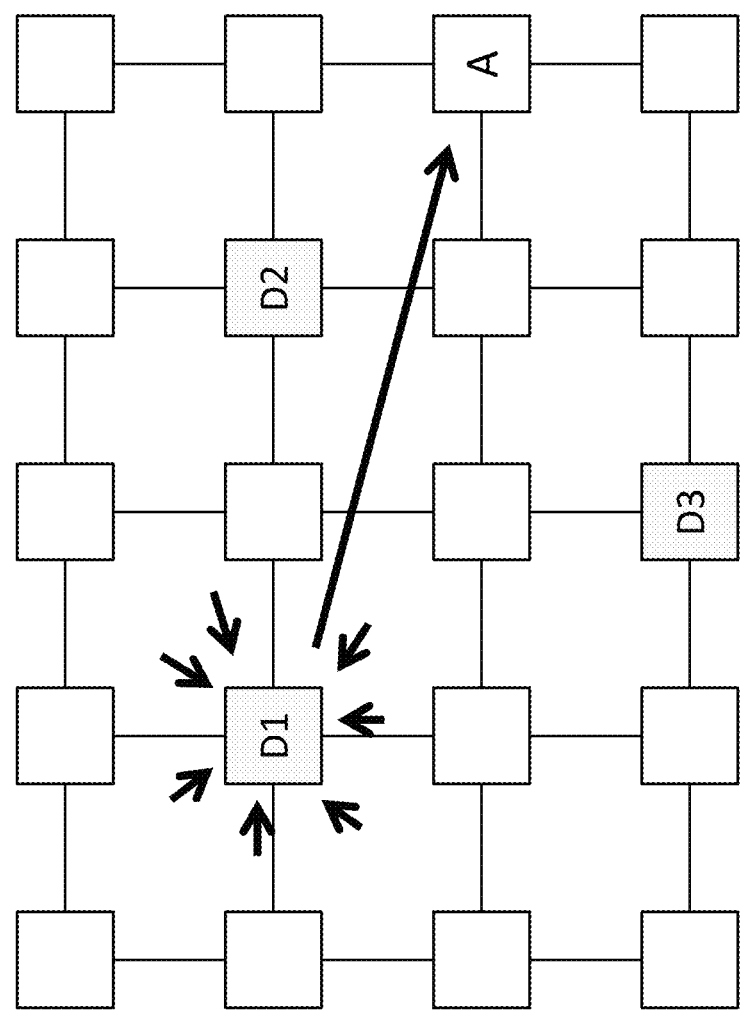

FIGS. 12(a) and 12(b) illustrate an example representation 1200 of inverted multicast messaging in accordance with an example implementation. In this example design, one or many NoC nodes (such as D1, D2, and D3) are assigned the responsibility of both the distribution of multicast messages as well as the aggregation of the inverted multicast messages. All multicast messages are first routed to one these nodes from the source node, where they are distributed for delivery to the destinations. All inverted multicast messages are first received at one of these nodes, where they are aggregated or combined into fewer messages and delivered to the destination. For each distribution and aggregation node, one or many multicast trees may be used, from which the node will send multicast message for distribution to all destinations or receive inverted multicast messages from various nodes for delivery to the single final destination. FIG. 12(a) illustrates the distribution, while FIG. 12(b) illustrates the aggregation. In the example of FIGS. 12(a) and 12(b), there are three distribution and aggregation nodes D1, D2, and D3. With reference to FIG. 12(a), a source node A can initially send the multicast message to node D1 for distribution of the message to multiple destination nodes. Subsequently, with reference to FIG. 12(b), responses of the earlier destination nodes (which now act as source nodes), can again be directed towards D1, where D1 then analyzes the messages and forms a single message by aggregating the responses such that the actual response from each earlier destination node (which now acts as source node) remains intact. Such a single message aggregated by the node D1 can then be forwarded to node A.

According to one example implementation, if inverted multicast messages are produced based on a previous multicast message, distribution and aggregation nodes may register such multicast messages and wait for all response messages to arrive so that they can be combined into a single message for delivery to the destination. The distribution of requests and aggregation of responses may use the same distribution and aggregation node. When the inverted multicast messages are not generated as a response of a multicast message, the distribution and aggregation nodes may combine messages opportunistically. In such a design, the distribution and aggregation nodes may buffer a potential inverted multicast message for certain time period and wait for additional messages to arrive. All messages that arrive during a defined time period can be combined and delivered to the destination. Furthermore, in such a design, a longer time period may require a larger buffer and may also increase the latency of messages, whereas a shorter time period may miss the opportunity to combine various messages. Therefore, the time period should be selected based on the optimization goals. Further, any other combination of distribution and aggregation nodes for distribution and/or aggregation of messages can be done, depending on the desired implementation.

The distribution and aggregation nodes in a NoC may also need to be selected depending on the desired implementation. Techniques similar to the above example implementations for multiple multicast tree construction may be used. If m distribution and aggregation nodes are allowed, then every combination of m NoC nodes from among all n nodes can be evaluated and a quality metric of each of these combinations can be computed assuming the m nodes in such a combination were made the distribution and aggregation node. Finally, the one with the highest quality may be selected and corresponding m nodes become the distribution and aggregation nodes. As also mentioned above, other many parameters can be selected and combined to make the quality metric.

Figure 13:
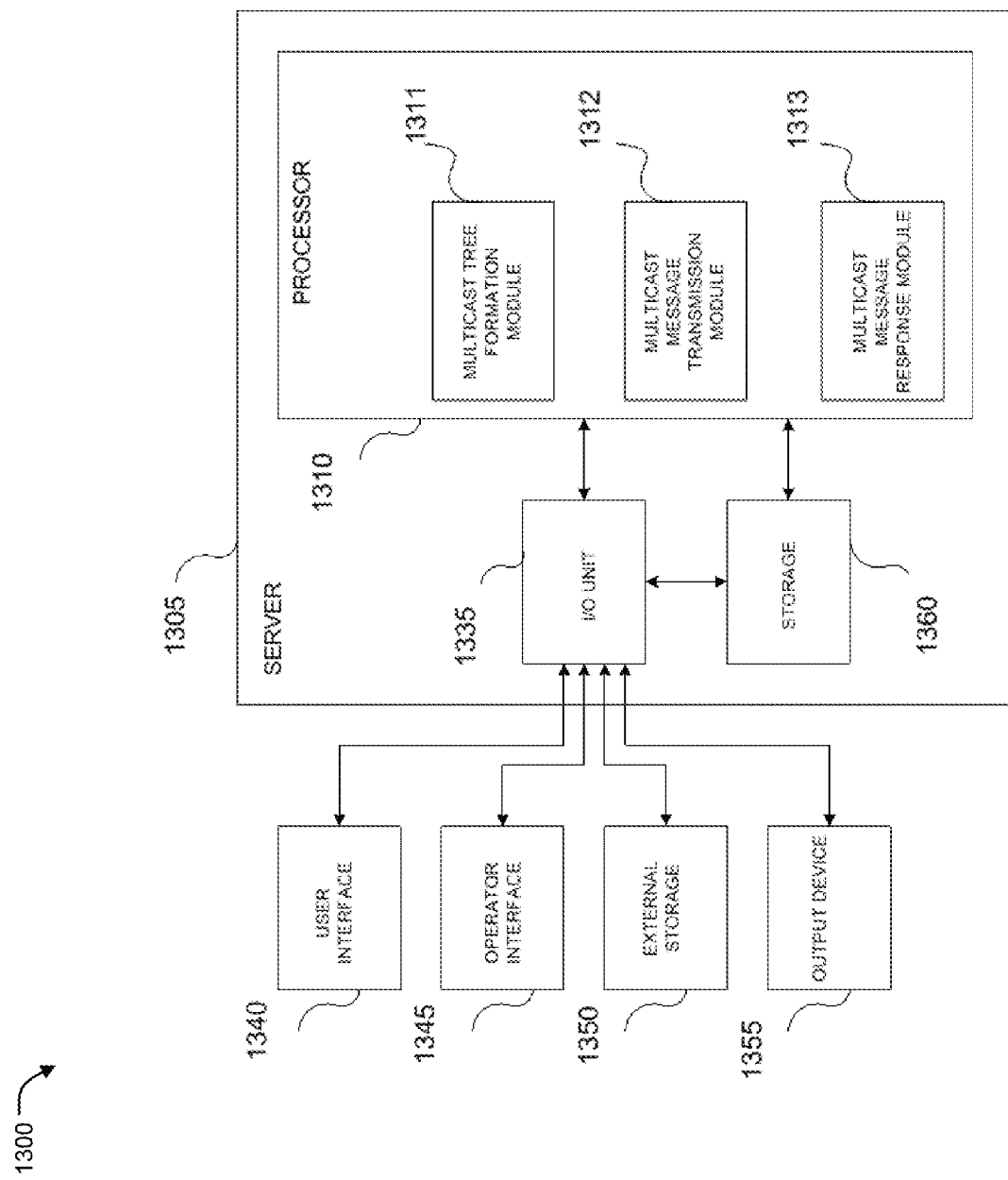
FIG. 13 illustrates an example of computer system on which example implementations can be implemented.

FIG. 13 illustrates an example computer system 1300 on which example implementations may be implemented. The computer system 1300 includes a server 1305 which may involve an I/O unit 1335, storage 1360, and a processor 1310 operable to execute one or more units as known to one of skill in the art. The term "computer-readable medium" as used herein refers to any medium that participates in providing instructions to processor 1310 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include carrier waves. The I/O unit processes input from user interfaces 1340 and operator interfaces 1345 which may utilize input devices such as a keyboard, mouse, touch device, or verbal command.

The server 1305 may also be connected to an external storage 1350, which can contain removable storage such as a portable hard drive, optical media (CD or DVD), disk media or any other medium from which a computer can read executable code. The server may also be connected an output device 1355, such as a display to output data and other information to a user, as well as request additional information from a user. The connections from the server 1305 to the user interface 1340, the operator interface 1345, the external storage 1350, and the output device 1355 may via wireless protocols, such as the 802.11 standards, Bluetooth® or cellular protocols, or via physical transmission media, such as cables or fiber optics. The output device 1055 may therefore further act as an input device for interacting with a user.

The processor 1310 may execute one or more modules including a multicast tree formation module 1311, a multicast message transmission module 1312, a multicast message response module 1313, wherein the multicast tree formation module 1311 can be configured to form one or more multicast trees, wherein each multicast tree provides a multicast function and comprises nodes of NoC interconnect such that all nodes of the NoC form part of the multicast tree. Multiple trees can also be formed by varying the combination and routes of NoC nodes such that a source node that has been injected a message from a source component can select a multicast tree from a set of available trees based on parameters such as latency, distance, hops, bandwidth, among others.

Multicast message transmission module 1312 can be configured to transmit the multicast message injected into the NoC from the source node to the destination nodes defined in the message through the selected multicast tree. As mentioned above, multicast message transmission module 1312 can also be implemented across different layers of NoC interconnect through TSVs that connect one or more nodes of each layer. In an example implementation, the multicast message transmission module 1312 can be implemented based on filters defined in nodes and/or ports of nodes such that the message is only copied and forwarded to nodes that are passed by the port or node level filter.

According to one example implementation, multicast message response module 1313 is configured to respond to or acknowledge the multicast message received at various destination nodes such that the response from destination nodes can be combined at an aggregation node into a single message (which retains all important content from destination nodes) and then transmitted back to the original source node (now acting as the destination node) for necessary and desired action.

Furthermore, some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A method, comprising:
generating one or more multicast trees for a provided Network on Chip (NoC) interconnect comprising a plurality of nodes;
configuring a source node from the plurality of nodes to receive a multicast message, the configuring the source node comprising storing the generated one or more multicast trees at the source node;
before receipt of the multicast message at the source node, configuring each port of each of the plurality of nodes with a filter based on the generated one or more multicast trees, the filter configured with a set of destination nodes representing a multicast tree from the generated one or more multicast trees in a form of a filter bit-vector, the filter configured as one of a logic or a circuit, wherein each bit of the filter bit-vector indicative of whether a corresponding destination bit from a destination bit-vector of the multicast message is to be filtered, and
for receipt of the multicast message at the source node, selecting a port configured with a filter representing the multicast tree from the one or more multicast trees directed to the received multicast message, the selecting conducted by the source node based on an application of logic between the destination bit-vector of the multicast message and the filter bit-vector; and
transmitting the multicast message from the source node through the selected port.

2. The method of claim 1, wherein the selecting the multicast tree from the one or more multicast trees is based on at least one of a distance of a destination node, a bandwidth attribute and a latency attribute.

3. The method of claim 1, further comprising configuring an aggregation node from the plurality of nodes, to aggregate a plurality of messages from the plurality of nodes to form the multicast message.

4. The method of claim 1, wherein the generating one or more multicast trees comprises:
generating a minimum spanning tree for each of the plurality of nodes;
generating subsets from the generated minimum spanning trees; and
combining edges of the minimum spanning trees for each subset to form one of the one or more multicast trees.

5. The method of claim 1, wherein the selecting conducted by the source node based on an application of logic between the destination bit-vector of the multicast message and the filter bit-vector comprises comparing each bit of the destination bit-vector to each bit of the filter bit-vector, and selecting the port having at least one matching bit.

6. A non-transitory computer readable storage medium storing instructions for executing a process, the instructions comprising:
generating one or more multicast trees for a provided Network on Chip (NoC) interconnect comprising a plurality of nodes;
configuring a source node from the plurality of nodes to receive a multicast message, the configuring the source node comprising storing the generated one or more multicast trees at the source node;
before receipt of the multicast message at the source node, configuring each port of each of the plurality of nodes with a filter based on the generated one or more multicast trees, the filter configured with a set of destination nodes representing a multicast tree from the generated one or more multicast trees in a form of a filter bit-vector, the filter configured as one of a logic or a circuit, wherein each bit of the filter bit-vector indicative of whether a corresponding destination bit from a destination bit-vector of the multicast message is to be filtered, and
for receipt of the multicast message at the source node, selecting a port configured with a filter representing the multicast tree from the one or more multicast trees directed to the received multicast message, the selecting conducted by the source node based on an application of logic between the destination bit-vector of the multicast message and the filter bit-vector; and
transmitting the multicast message from the source node through the selected port.

7. The non-transitory computer readable storage medium of claim 6, wherein the selecting the multicast tree from the one or more multicast trees is based on at least one of a distance of a destination node, a bandwidth attribute and a latency attribute.

8. The non-transitory computer readable storage medium of claim 6, wherein the instructions further comprise configuring an aggregation node from the plurality of nodes to aggregate a plurality of messages from a the plurality of nodes to form the multicast message.

9. The non-transitory computer readable storage medium of claim 6, wherein the generating one or more multicast trees comprises:
generating a minimum spanning tree for each of the plurality of nodes;
generating subsets from the generated minimum spanning trees; and
combining edges of the minimum spanning trees for each subset to form one of the one or more multicast trees.

10. A system, comprising:
a processor coupled to a memory, configured to:
generate one or more multicast trees for a provided Network on Chip (NoC) interconnect comprising a plurality of nodes;
configure a source node from the plurality of notes nodes to receive a multicast message, wherein the configuration of the source node comprises storing the generated one or more multicast trees at the source node;
before receipt of the multicast message at the source node, configuring each port of each of the plurality of nodes with a filter based on the generated one or more multicast trees, the filter configured with a set of destination nodes representing a multicast tree from the generated one or more multicast trees in a form of a filter bit-vector, the filter configured as one of a logic or a circuit, wherein each bit of the filter bit-vector indicative of whether a corresponding destination bit from a destination bit-vector of the multicast message is to be filtered, and
for receipt of the multicast message at the source node, select a port configured with a filter representing the multicast tree from the one or more multicast trees directed to the received multicast message, the selecting conducted by the source node based on an application of logic between the destination bit-vector of the multicast message and the filter bit-vector; and transmit the multicast message from a transmitter of the source node through the selected port.

11. The system of claim 10, wherein the processor is configured to select the multicast tree from the one or more multicast trees based on at least one of a distance of a destination node, a bandwidth attribute and a latency attribute.

12. The system of claim 10, wherein the processor is configured to configure an aggregation node from the plurality of nodes to aggregate a plurality of messages from a the plurality of nodes to form the multicast message.

13. The system of claim 10, wherein the processor is configured to generate one or more multicast trees from a plurality of nodes of a Network on Chip (NoC) by a process comprising:
generating a minimum spanning tree for each of the plurality of nodes;
generating subsets from the generated minimum spanning trees; and
combining edges of the minimum spanning trees for each subset to form one of the one or more multicast trees.

\* \* \* \* \*